US010644867B2

(12) United States Patent
Yan et al.

(10) Patent No.: US 10,644,867 B2
(45) Date of Patent: May 5, 2020

(54) METHOD, DEVICE, AND SYSTEM FOR SYNCHRONIZING CLOCKS OF PROCESSORS

(71) Applicant: Beijing Xiaoniao Tingting Technology Co., LTD, Beijing (CN)

(72) Inventors: Hao Yan, Beijing (CN); Penghui Chen, Beijing (CN); Chongle Wang, Beijing (CN)

(73) Assignee: BEIJING XIAONIAO TINGTING TECHNOLOGY CO., LTD., Beijing (CN)

( * ) Notice: Subject to any disclaimer, the term of this patent is extended or adjusted under 35 U.S.C. 154(b) by 204 days.

(21) Appl. No.: 15/896,081

(22) Filed: Feb. 14, 2018

(65) Prior Publication Data

US 2018/0262321 A1    Sep. 13, 2018

(30) Foreign Application Priority Data

Feb. 22, 2017    (CN) .......................... 2017 1 0097612

(51) Int. Cl.
*G06F 15/16*    (2006.01)
*H04L 7/00*    (2006.01)
(Continued)

(52) U.S. Cl.
CPC ....... *H04L 7/0037* (2013.01); *H04W 56/0015* (2013.01); *H04W 4/80* (2018.02); *H04W 84/12* (2013.01); *H04W 84/18* (2013.01)

(58) Field of Classification Search
CPC .. H04L 7/0037; H04W 56/0015; H04W 4/80; H04W 84/12; H04W 84/18
See application file for complete search history.

(56) References Cited

U.S. PATENT DOCUMENTS 5,812,547 A * 9/1998 Benzimra ......... H04W 72/0446
                                               370/350
5,951,669 A * 9/1999 Bailey .................... G06F 13/24
                                               710/23
(Continued)

FOREIGN PATENT DOCUMENTS

JP    2010050761 A  *  3/2010
JP    2010050761 A     3/2010

OTHER PUBLICATIONS

JP2010050761A (English Translation) (Year: 2010).*
Supplementary European Search Report in European application No. 18156522.7, dated Jun. 27, 2018.

*Primary Examiner* — Sm A Rahman
(74) *Attorney, Agent, or Firm* — Syncoda LLC; Feng Ma

(57) ABSTRACT

A wireless communication clock synchronized with a peer electronic device in the network is established at the first electronic device. Interruption signals are generated by the first electronic device synchronously with the peer accordingly. A clock value of a processor of the first electronic device at generating a last interruption signal is recorded by the first electronic device. A synchronization request including the clock value recorded is sent to the peer, to trigger adjusting, by the peer according to a difference between the clock value recorded by the first electronic device and a clock value recorded by the peer, a clock of a processor of the peer electronic device to be synchronized with a clock of the processor of the first electronic device. The clock value recorded by the peer electronic device is the clock value of the processor of the peer electronic device at generating a last interruption signal.

18 Claims, 18 Drawing Sheets

(51) Int. Cl.
  *H04W 56/00*  (2009.01)
  *H04W 84/12*  (2009.01)
  *H04W 84/18*  (2009.01)
  *H04W 4/80*  (2018.01)

(56) References Cited

U.S. PATENT DOCUMENTS

| | | | |
|---|---|---|---|
| 7,023,833 B1* | 4/2006 | Aiello | H04W 56/0015 370/329 |
| 2008/0275828 A1* | 11/2008 | Payton | G06F 11/30 706/16 |
| 2016/0191752 A1* | 6/2016 | Takitsune | H04N 5/067 348/518 |
| 2016/0262120 A1 | 9/2016 | Shani et al. | |

* cited by examiner

METHOD, DEVICE, AND SYSTEM FOR SYNCHRONIZING CLOCKS OF PROCESSORS

TECHNICAL FIELD

The present disclosure relates to the field of communications, and in particular to a method, device, and system for synchronizing clocks of processors.

BACKGROUND

As a first electronic device such as a smart phone, a tablet PC, and a laptop gets more and more popular and smarter, there has been a demand for networking electronic devices to implement collaborative computations of all kinds.

Electronic devices may discover and be connected to each other via wireless communication technology. For electronic devices in a network to collaborate with each other to play an audio and/or a video, display a picture, etc., it is crucial for them to have synchronized data.

For example, for smart sound, a smart sound device in a home is responsible for playing a channel of audio data. Smart sound devices may have to cooperate with each other to achieve multichannel effect. For smart sound devices to play audio data synchronously, clocks of processors of the smart sound devices have to be synchronized with each other, such that the smart sound devices may process, synchronously according to the clocks of the processors, audio data received respectively.

In existing art, to synchronize clocks of processors, a clock of a processor may be read. An amount by which the clock is to be adjusted may be determined according to the reading. The clock may be adjusted accordingly.

However, real-time performance in reading a clock of a processor may barely meet a requirement for real-time accuracy in adjusting the clock of the processor. A delay may impact accuracy of a clock of a processor of a first electronic device. In addition, the very operation of reading a clock of a processor may cause a jitter of the clock. Multiple signaling exchanges with a processor regarding clock synchronization may be required, impacting accuracy of the clock of the processor.

To sum up, there is yet no effective solution for efficient accurate synchronization of clocks of processors of electronic devices to date.

SUMMARY

Embodiments herein provide a method, device, and system for synchronizing clocks of processors, capable of efficient accurate synchronization of clocks of processors of electronic devices.

A solution herein may be implemented as follows.

According to a first aspect herein, a method for synchronizing clocks of processors applies to a network including at least a first electronic device and a second electronic device in wireless communication. The method includes:

establishing, at the first electronic device, a wireless communication clock synchronized with that at any peer electronic device in the network;

generating, by the first electronic device, interruption signals synchronously with the any peer electronic device according to the wireless communication clock;

recording, by the first electronic device, a clock value of a processor of the first electronic device at generating a last interruption signal by the first electronic device; and sending, by the first electronic device to the any peer electronic device, a synchronization request including the clock value recorded by the first electronic device, to trigger adjusting, by the any peer electronic device according to a difference between the clock value recorded by the first electronic device and a clock value recorded by the any peer electronic device, a clock of a processor of the any peer electronic device to be synchronized with a clock of the processor of the first electronic device, The clock value recorded by the any peer electronic device is the clock value of the processor of the any peer electronic device at generating a last interruption signal by the any peer electronic device.

The generating, by the first electronic device, interruption signals synchronously with the any peer electronic device according to the wireless communication clock may include:

when the network is a Bluetooth (BT) network, generating an interruption signal in the first electronic device every predetermined number of cycles of a BT clock.

The generating, by the first electronic device, interruption signals synchronously with the any peer electronic device according to the wireless communication clock may include:

when the network is a Wireless Local Area Network (WLAN), generating an interruption signal after the first electronic device has received a predetermined number of beacons. The beacons may be sent regularly by an access device of the network.

The establishing, at the first electronic device, a wireless communication clock synchronized with that at any peer electronic device in the network may include:

when the network is a piconet and the any peer electronic device may include at least two peer electronic devices connected to the first electronic device, establishing, at the first electronic device, the wireless communication clock synchronized with those at the at least two peer electronic devices.

The sending, by the first electronic device to the any peer electronic device, a synchronization request may include:

sending synchronization requests to the at least two peer electronic devices synchronously or asynchronously.

The establishing, at the first electronic device, a wireless communication clock synchronized with that at any peer electronic device in the network may include:

when the network is a scattered network and each piconet of the scattered network includes at least one peer electronic device connected to the first electronic device, establishing, at the first electronic device, a wireless communication clock synchronized with that at each peer electronic device. Wireless communication clocks established corresponding respectively to the peer electronic devices may be independent of each other.

The generating, by the first electronic device, interruption signals synchronously with the any peer electronic device according to the wireless communication clock may include:

generating interruption signals synchronously with the each peer electronic device according to the established wireless communication clock synchronized with that at the each peer electronic device.

The sending, by the first electronic device to the any peer electronic device, a synchronization request including the clock value recorded by the first electronic device may include:

sending, by the first electronic device, synchronization requests to the peer electronic devices synchronously or asynchronously. A synchronization request sent by the first electronic device to a peer electronic device may include a clock value of a processor of the first electronic device recorded by the first electronic device when generating the last interruption signal synchronously with the peer electronic device.

The sending, by the first electronic device to the any peer electronic device, a synchronization request may include:

when the first electronic device is connected sequentially to peer electronic devices, sending, by the first electronic device, a synchronization request to the second electronic device connected to the first electronic device to trigger processor clock synchronization at the second electronic device, such that the second electronic device sends a synchronization request to a third electronic device connected to the second electronic device and so on, until processor clock synchronization at each peer electronic device completes sequentially.

The method may further include:

determining, by the first electronic device, whether the any peer electronic device has completed processor clock synchronization within an interval spanned by two consecutive interruption signals; If the any peer electronic device has not, sending an updated synchronization request to the any peer electronic device. The updated synchronization request may include an updated clock value recorded by the first electronic device. The updated clock value recorded by the first electronic device may be the updated clock value of the processor of the first electronic device at generating the last interruption signal by the first electronic device.

The determining, by the first electronic device, whether the any peer electronic device has completed processor clock synchronization within an interval spanned by two consecutive interruption signals may include:

upon receiving a synchronization response sent by the any peer electronic device, determining, by the first electronic device, whether the processor clock value sent to the any peer electronic device equals the clock value of the processor of the first electronic device as recorded by the first electronic device at generating the last interruption signal; if they equal, determining that the any peer electronic device has completed processor clock synchronization within the interval spanned by two consecutive interruption signals; if they do not equal, determining that the any peer electronic device has failed to complete processor clock synchronization within the interval spanned by two consecutive interruption signals.

The method may further include:

in response to determining that the any peer electronic device has completed processor clock synchronization within an interval spanned by two consecutive interruption signals, sending, by the first electronic device, a notification of successful synchronization to the any peer electronic device, and receiving a response of successful synchronization sent by the any peer electronic device.

The notification of successful synchronization or the response of successful synchronization may include a common task time of the electronic devices in the network.

The method may further include:

recording, by the first electronic device, at least two instances of an interval spanned by two consecutive interruption signals generated by the first electronic device according to the clock of the processor of the first electronic device;

setting, by the first electronic device, a reference span for determining the interval spanned by two consecutive interruption signals according to the recorded at least two instances; and acquiring, by the first electronic device, a jitter offset by subtracting the reference span from a difference between the clock values of the processor of the first electronic device corresponding to two consecutive interruption signals generated by the first electronic device; and adjusting, by the first electronic device, the clock of the processor of the first electronic device according to the jitter offset.

The method may further include:

executing, with the any peer electronic device in the network according to the synchronized clocks of the processors thereof within an agreed-on task time, at least one of: starting a computation task; discarding a computation task; modifying a received computation task, etc.

According to a second aspect herein, a method for synchronizing clocks of processors applies to a network including at least a first electronic device and a second electronic device in wireless communication. The method includes:

establishing, at the second electronic device, a wireless communication clock synchronized with that at any peer electronic device in the network;

generating, by the second electronic device, interruption signals synchronously with the any peer electronic device according to the wireless communication clock;

recording, by the second electronic device, a clock value of a processor of the second electronic device at generating a last interruption signal by the second electronic device;

receiving, by the second electronic device, a synchronization request sent by the first electronic device, the synchronization request including a clock value recorded by the first electronic device, The clock value recorded by the first electronic device is the clock value of a processor of the first electronic device at generating a last interruption signal by the first electronic device; and adjusting, by the second electronic device according to a difference between the clock value recorded by the first electronic device and the clock value recorded by the second electronic device, a clock of the processor of the second electronic device to be synchronized with a clock of the processor of the first electronic device.

The generating, by the second electronic device, interruption signals synchronously with the any peer electronic device according to the wireless communication clock may include:

when the network is a Bluetooth (BT) network, generating an interruption signal every predetermined cycles of a BT clock in the second electronic device.

The generating, by the second electronic device, interruption signals synchronously with the any peer electronic device according to the wireless communication clock may include:

when the network is a Wireless Local Area Network (WLAN), generating an interruption signal after a predetermined number of beacons are received at the second electronic device. The beacons may be sent regularly by an access device of the network.

The method may further include: after the receiving, by the second electronic device, a synchronization request sent by the first electronic device, sending, by the second electronic device, a synchronization response to the first electronic device, such that upon receiving the synchronization response, the first electronic device determines whether the second electronic device has completed processor clock synchronization within an interval spanned by two consecutive interruption signals by determining whether the clock value in the synchronization request equals the clock value of the processor of the first electronic device as recorded by the first electronic device at generating the last interruption signal.

The method may further include:

when the second electronic device has not completed processor clock synchronization within the interval spanned by two consecutive interruption signals, receiving, by the second electronic device, an updated synchronization request sent by the first electronic device. The updated synchronization request may include an updated clock value recorded by the first electronic device. The updated clock value recorded by the first electronic device may be the updated clock value of the processor of the first electronic device at generating a last interruption signal by the first electronic device.

adjusting, according to a difference between the updated clock value recorded by the first electronic device and an updated clock value recorded by the second electronic device, the clock of the processor of the second electronic device to be synchronized with the clock of the processor of the first electronic device. The updated clock value recorded by the second electronic device may be the updated clock value of the processor of the second electronic device at generating a last interruption signal by the second electronic device.

The method may further include:

when the second electronic device has completed processor clock synchronization within the interval spanned by two consecutive interruption signals, receiving, by the second electronic device, a notification of successful synchronization sent by the first electronic device, and sending a response of successful synchronization to the first electronic device.

The notification of successful synchronization or the response of successful synchronization may include a common task time of the electronic devices in the network.

The method may further include: after synchronizing the clock of the processor per se with the clock of the processor of the first electronic device, recording, by the second electronic device, at least two instances of an interval spanned by two consecutive interruption signals generated by the second electronic device according to the clock of the processor of the second electronic device;

setting, by the second electronic device, a reference span for determining the interval spanned by two consecutive interruption signals according to the recorded at least two instances; and acquiring, by the second electronic device, a jitter offset by subtracting the reference span from a difference between the clock values of the processor of the second electronic device corresponding to two consecutive interruption signals generated by the second electronic device; and adjusting, by the second electronic device, the clock of the processor of the second electronic device according to the jitter offset.

The method may further include:

when the first electronic device is connected sequentially to peer electronic devices, after the second electronic device connected to the first electronic device has completed processor clock synchronization according to the synchronization request sent by the first electronic device, sending, by the second electronic device, a synchronization request to a third electronic device connected to the second electronic device.

The method may further include:

executing, with the any peer electronic device in the network according to the synchronized clocks of the processors thereof within an agreed-on task time, at least one of: starting a computation task; discarding a computation task; modifying a received computation task, etc.

According to a third aspect herein, a first electronic device applies to a network including at least the first electronic device and a second electronic device in wireless communication. The first electronic device may include:

a communication clock unit arranged for establishing a wireless communication clock synchronized with that at any peer electronic device in the network;

an interrupting unit arranged for generating interruption signals synchronously with the any peer electronic device according to the wireless communication clock;

a processor clock unit arranged for recording a clock value of a processor of the first electronic device at generating a last interruption signal by the first electronic device; and a processor clock synchronizing unit arranged for sending, to the any peer electronic device, a synchronization request including the clock value recorded by the first electronic device, to trigger adjusting, by the any peer electronic device according to a difference between the clock value recorded by the first electronic device and a clock value recorded by the any peer electronic device, a clock of a processor of the any peer electronic device to be synchronized with a clock of the processor of the first electronic device.

The clock value recorded by the any peer electronic device is the clock value of the processor of the any peer electronic device at generating a last interruption signal by the any peer electronic device.

The interrupting unit may be further arranged for: when the network is a BT network, generating an interruption signal every predetermined number of cycles of a BT clock in the communication clock unit.

The interrupting unit may be further arranged for: when the network is a WLAN, generating the interruption signal after a predetermined number of beacons are received at the first electronic device. The beacons may be sent regularly by an access device of the network.

The communication clock unit may be further arranged for: when the network is a piconet and the any peer electronic device may include at least two peer electronic devices connected to the first electronic device, establishing the wireless communication clock synchronized with those at the at least two peer electronic devices.

The processor clock synchronizing unit may be further arranged for sending synchronization requests to the at least two peer electronic devices synchronously or asynchronously.

The communication clock unit may be further arranged for: when the network is a scattered network and each piconet of the scattered network includes at least one peer electronic device connected to the first electronic device, establishing, at the first electronic device, a wireless communication clock synchronized with that at each peer electronic device. Wireless communication clocks established corresponding respectively to the peer electronic devices may be independent of each other.

The interrupting unit may be further arranged for: generating interruption signals synchronously with the peer electronic devices according to the established wireless communication clock synchronized with those at the peer electronic devices.

The processor clock synchronizing unit may be further arranged for: sending synchronization requests to the peer electronic devices synchronously or asynchronously. A synchronization request sent to a peer electronic device may include a clock value of a processor recorded when the last interruption signal is generated synchronously with the peer electronic device.

The processor clock synchronizing unit may be further arranged for: when the first electronic device is connected sequentially to peer electronic devices, sending a synchronization request to the second electronic device connected to the first electronic device to trigger processor clock synchronization at the second electronic device, such that the second electronic device sends a synchronization request to a third electronic device connected to the second electronic device and so on, until processor clock synchronization at each peer electronic device completes sequentially.

The processor clock synchronizing unit may be further arranged for determining whether a peer electronic device has completed processor clock synchronization within an interval spanned by two consecutive interruption signals; If not, sending an updated synchronization request to the peer electronic device. The updated synchronization request may include an updated clock value recorded by the first electronic device. The updated clock value recorded by the first electronic device may be the updated clock value of the processor of the first electronic device at generating the last interruption signal by the first electronic device.

The processor clock synchronizing unit may be further arranged for: upon receiving a synchronization response sent by a peer electronic device, determining whether the processor clock value sent to the peer electronic device equals the clock value of the processor of the first electronic device as recorded by the interrupting unit at generating the last interruption signal; if so, determining that the peer electronic device has completed processor clock synchronization within an interval spanned by two consecutive interruption signals; if not, determining that the peer electronic device has failed to complete processor clock synchronization within the interval spanned by two consecutive interruption signals.

The processor clock synchronizing unit may be further arranged for: in response to determining that the peer electronic device has completed processor clock synchronization within the interval spanned by two consecutive interruption signals, sending a notification of successful synchronization to the peer electronic device, and receiving a response of successful synchronization sent by the peer electronic device.

The processor clock synchronizing unit may be further arranged for: recording at least two instances of the interval spanned by two consecutive interruption signals generated by the first electronic device according to the clock of the processor of the first electronic device; setting a reference span for determining the interval spanned by two consecutive interruption signals according to the recorded at least two instances; and acquiring a jitter offset by subtracting the reference span from the difference between the clock values of the processor of the first electronic device corresponding to two consecutive interruption signals generated by the first electronic device; and adjusting the clock of the processor of the first electronic device according to the jitter offset.

The first electronic device may further include a computation task unit arranged for:

executing, with the any peer electronic device in the network according to the synchronized clocks of the processors thereof within an agreed-on task time, at least one of: starting a computation task; discarding a computation task; modifying a received computation task, etc.

According to a fourth aspect herein, a second electronic device applies to a network including at least a first electronic device and the second electronic device in wireless communication. The second electronic device may include:

a communication clock unit arranged for establishing a wireless communication clock synchronized with that at any peer electronic device in the network;

an interrupting unit arranged for generating interruption signals synchronously with the any peer electronic device according to the wireless communication clock, and recording a clock value of a processor of the second electronic device at generating a last interruption signal by the second electronic device;

a processor clock unit arranged for receiving a synchronization request sent by the first electronic device, the synchronization request including a clock value recorded by the first electronic device, The clock value recorded by the first electronic device is the clock value of a processor of the first electronic device at generating a last interruption signal by the first electronic device; and a processor clock synchronizing unit arranged for adjusting, according to a difference between the clock value recorded by the first electronic device and the clock value recorded by the second electronic device, a clock of the processor of the second electronic device to be synchronized with a clock of the processor of the first electronic device.

The interrupting unit may be further arranged for: when the network is a BT network, generating an interruption signal every predetermined cycles of a BT clock in the communication clock unit.

The interrupting unit may be further arranged for: when the network is a WLAN, generating an interruption signal after a predetermined number of beacons are received at the second electronic device. The beacons may be sent regularly by an access device of the network.

The processor clock synchronizing unit may be further arranged for: after the second electronic device has received the synchronization request sent by the first electronic device, sending a synchronization response to the first electronic device.

Upon receiving the synchronization response, the first electronic device may determine whether the second electronic device has completed processor clock synchronization within an interval spanned by two consecutive interruption signals by determining whether the clock value in the synchronization request equals the clock value of the processor of the first electronic device as recorded by the first electronic device at generating the last interruption signal.

The processor clock unit may be further arranged for: in response to that the second electronic device has not completed processor clock synchronization within the interval spanned by two consecutive interruption signals, receiving an updated synchronization request sent by the first electronic device. The updated synchronization request may include an updated clock value recorded by the second electronic device. The updated clock value recorded by the second electronic device may be the updated clock value of the processor of the second electronic device at generating a last interruption signal by the second electronic device.

The processor clock synchronizing unit may be further arranged for: adjusting, according to a difference between the updated clock value recorded by the first electronic device and an updated clock value recorded by the second electronic device, the clock of the processor of the second electronic device to be synchronized with the clock of the processor of the first electronic device. The updated clock value recorded by the second electronic device may be the updated clock value of the processor of the second electronic device at generating a last interruption signal by the second electronic device.

The processor clock synchronizing unit may be further arranged for: when the processor clock synchronizing unit has completed processor clock synchronization within the interval spanned by two consecutive interruption signals, receiving a notification of successful synchronization sent by the first electronic device, and sending a response of successful synchronization to the first electronic device.

The process of clock synchronizing unit may be further arranged for: after synchronizing the clock of the processor per se with the clock of the processor of the first electronic device, recording at least two instances of the interval spanned by two consecutive interruption signals generated by the second electronic device according to the clock of the processor of the second electronic device; setting a reference span for determining the interval spanned by two consecutive interruption signals according to the recorded at least two instances.

The processor clock synchronizing unit may be further arranged for: acquiring a jitter offset by subtracting the reference span from the difference between the clock values of the processor of the second electronic device corresponding to two consecutive interruption signals generated by the interrupting unit; and adjusting the clock of the processor of the second electronic device according to the jitter offset.

The second electronic device may further include a computation task unit arranged for:

executing, with the any peer electronic device in the network according to the synchronized clocks of the processors thereof within an agreed-on task time, at least one of: starting a computation task; discarding a computation task; modifying a received computation task, etc.

According to a fifth aspect herein, a system for synchronizing clocks of processors includes at least a first electronic device and a second electronic device in wireless communication that form a network.

The first electronic device is arranged for:

establishing a wireless communication clock synchronized with that at any peer electronic device in the network;

generating interruption signals synchronously with the any peer electronic device according to the wireless communication clock;

recording a clock value of a processor of the first electronic device at generating a last interruption signal by the first electronic device; and sending, to the any peer electronic device, a synchronization request including the clock value recorded by the first electronic device.

The second electronic device is arranged for:

adjusting, according to a difference between the clock value recorded by the first electronic device and a clock value recorded by the second electronic device, a clock of a processor of the second electronic device to be synchronized with a clock of the processor of the first electronic device.

The clock value recorded by the second electronic device is the clock value of the processor of the second electronic device at generating a last interruption signal by the second electronic device.

According to a sixth aspect herein, a computer-readable storage medium stores therein executable instructions for executing a method for synchronizing clocks of processors herein.

To sum up, embodiments herein are advantageous as follows.

On one hand, the peer electronic device records the clock value of the processor per se corresponding to an interruption signal according to the clock of the processor per se; acquires the clock value recorded by the first electronic device as of the processor of the first electronic device according to the clock of the processor of the first electronic device; acquires the difference between the clock value recorded by the first electronic device and the clock value recorded per se, providing an accurate measure of the deviation of the clock of the processor of the peer electronic device from the clock of the processor of the first electronic device, thus implementing accurate synchronization of the clocks of the processors.

On the other hand, compared to the existing art where clocks of processors are synchronized by reading clocks of respective processors, determining an amount by which the clock is to be adjusted according to the readings, and adjusting the clocks accordingly, the peer electronic device adjusts the clock of the processor per se according to the difference between the clock values of the processors, avoiding a delay and a jitter of a clock of a processor caused by directly reading the clock of the processor, such that clocks of processors of the electronic devices may be synchronized more efficiently, with accuracy thereof guaranteed.

DETAILED DESCRIPTION

A solution herein is elaborated below with reference to drawings and embodiments. An embodiment described herein is intended but to describe and explain the present disclosure instead of limiting the present disclosure.

Before the present disclosure is elaborated, names and terms involved in embodiments herein are described and explained as follows.

1) A processor clock, also referred to as a system clock, is a clock of a processor in an electronic device, such as a clock of a Central Processing Unit (CPU) in an electronic device, a clock of a Micro Processing Unit (MCU) in an electronic device, etc.

2) A wireless communication clock is a clock of a wireless communication chip, such as a BT chip, a WiFi chip, etc., in an electronic device, a clock of a wireless communication chip of a peer electronic device, etc. A wireless communication clock in an electronic device and a clock of a processor of the electronic device are independent of, and thus have no impact on, each other.

Before processor clock synchronization herein is described, a wireless communication clock based on a BT chip, a WLAN chip, etc., may be described.

1) BT Chip Based Wireless Communication Clocks, and Synchronization Thereof

A communication clock of a BT chip may also be referred to as a BT clock. A BT clock may determine a frequency of regular transceiving by the BT chip. To synchronize a BT clock of an electronic device and a BT clock of a peer electronic device, an offset may have to be offered to the peer electronic device for synchronizing the BT clocks.

Figure 1A:
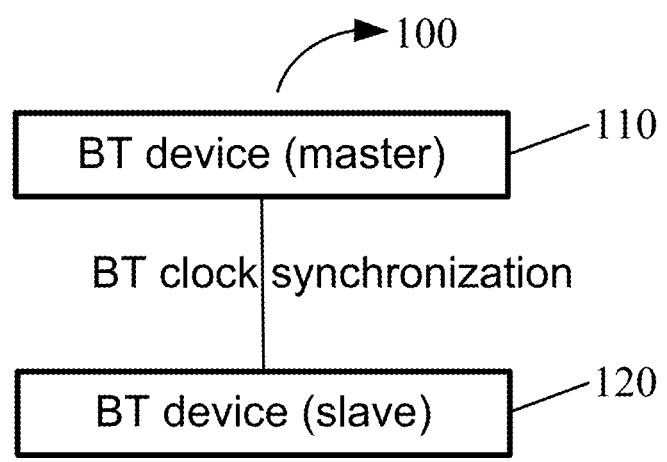
FIG. 1A is a diagram of a piconet of Bluetooth (BT) devices according to an embodiment herein.

According to a BT protocol, two or more electronic devices provided with BT chips (BT devices for short) may form a piconet. FIG. 1A is a diagram of a piconet 100 of BT devices according to an embodiment herein. A piconet may be formed by a master (such as a BT device 110) and a slave (such as a BT device 120, where there may, of course, be more than one slave in the piconet). The master may form a point-to-point connection to a slave, or a point-to-multipoint connection to multiple slaves. Synchronized BT clocks of the master and the slave may also be referred to as piconet clocks.

Figure 1B:
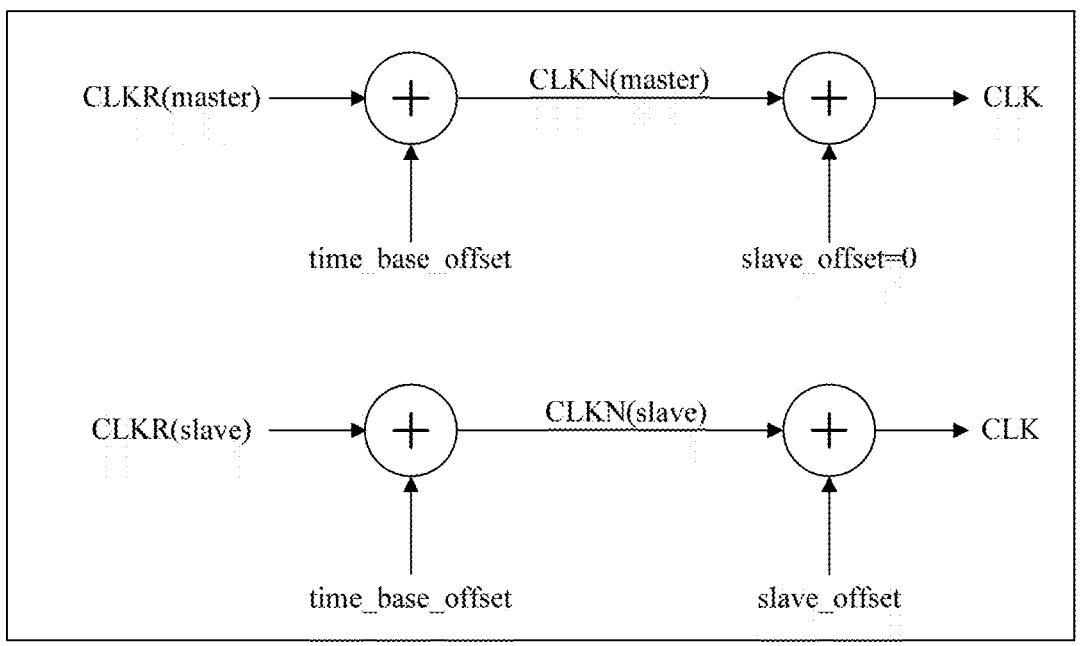
FIG. 1B is a flowchart of piconet clock synchronization at BT devices in a piconet according to an embodiment herein.

FIG. 1B is a flowchart of piconet clock synchronization at BT devices in a piconet according to an embodiment herein. CLK may stand for the piconet clock applying to all time sequence arrangement and timing throughout the piconet. A BT device may schedule transceiving using the CLK. The CLK may have to be taken from a reference clock (CLKR) plus a base time offset (time_base_offset), a slave offset (slave_offset), etc.

A BT device may keep, in the time_base_offset, a locally generated compensation applying to a CLKN in order for it to be aligned with an external clock reference or base. The slave_offset for the master is 0, as the CLK may refer to the clock CLKN of the master. A proper slave_offset may have to be added to the CLKN of the slave to align it with the CLKN of the master.

Although all CLKNs run at one nominal rate on devices, drifts with respect to each other may lead to inaccurate CLKs. Therefore, slave offsets may be updated periodically. Thus, the CLKs may approximate the CLKN of the master to implement synchronization of the piconet clocks of the BT devices in the piconet.

Figure 1C:
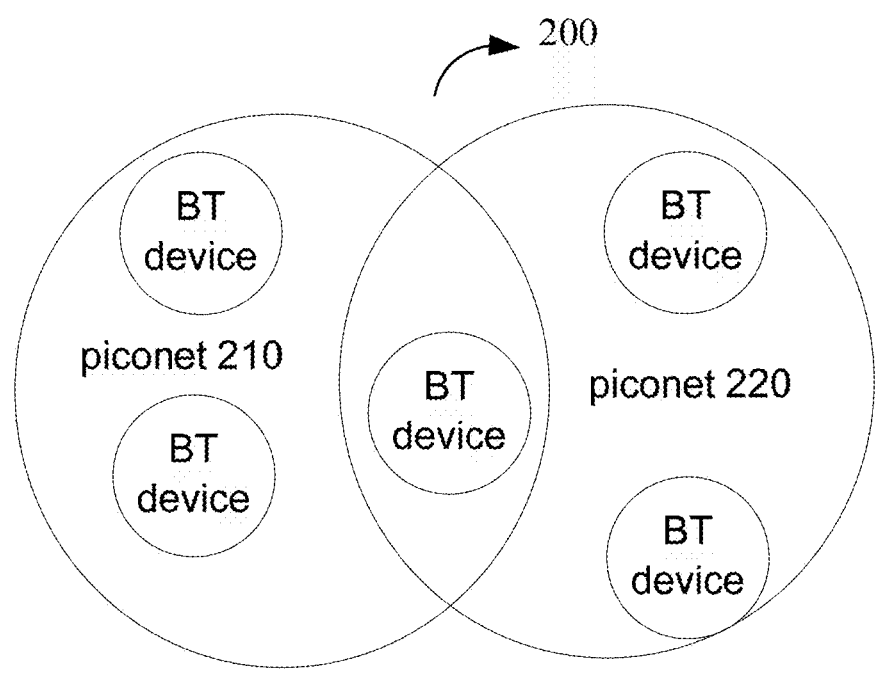
FIG. 1C is a diagram of a structure of a scattered network according to an embodiment herein.

In addition, multiple piconets may be connected to form a scattered network. FIG. 1C is a diagram of a structure of a scattered piconet 200 according to an embodiment herein. In FIG. 1C, a piconet 210 and a piconet 220 (or more piconets) may be connected to form the scattered network 200. The connected piconets may share a common BT device. Generally, the common BT device may play different roles in the two connected piconets. For example, the common BT device may be a master in the piconet 210, and a slave in the piconet 220.

To synchronize BT clocks in the scattered network 200, a synchronized piconet clock may be established in each piconet thereof. A synchronized clock of a piconet 1 may be established for each of a BT device 110 and a BT device 120. A synchronized clock of a piconet 2 may be established for each of the BT device 120 and a BT device 130. According to a BT protocol, a common device shared by two piconets may not serve as a master of both piconets. Thus, the clock of the piconet 1 may have to differ from the clock of the piconet 2. For example, clock periods thereof may start at different points of time.

Note that a piconet and a scattered network may not be distinguished below. A solution for a piconet may as well apply to a scattered network.

2) WLAN Chip Based Wireless Communication Clocks, and Synchronization Thereof

A wireless communication clock of a WLAN chip, such as a WiFi chip, may also be referred to as a WiFi clock. A WiFi clock may determine a timeslot in which a WiFi device may communicate with an access device such as a wireless router or a wireless Access Point (AP).

Figure 2:
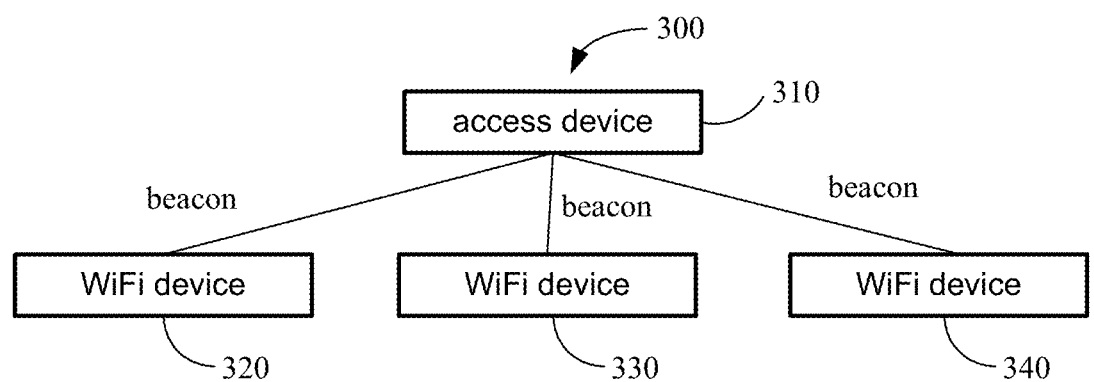
FIG. 2 is a diagram of a Wireless Local Area Network (WLAN) of Wireless Fidelity (WiFi) devices according to an embodiment herein.

Electronic devices provided with WiFi chips (WiFi devices for short) may form a network such as a star network. Two or more electronic devices provided with WLAN chips (WiFi devices for short) may form a WLAN. FIG. 2 is a diagram of a WLAN 300 of WiFi devices according to an embodiment herein. The WLAN may include an access device providing an access function (WiFi device 310) and multiple WiFi devices (a WiFi device 320 to a WiFi device 340). According to a WiFi protocol, a WiFi device connected to an access device may receive beacons sent by the access device at regular intervals (every 102.4 ms, for example). A WiFi clock may be defined by points of time at which the WiFi device receives the beacons.

According to an embodiment herein, a method for synchronizing clocks of processors applies to a wireless communication network (network for short) of at least two electronic devices, and can synchronize clocks of processors of the networked electronic devices.

A network may be formed according to BT technology as shown in FIG. 1A and FIG. 1C. For example, a network may be formed according to BT 4.0, a subsequent evolved release, etc. A network may be formed according to WLAN technology as shown in FIG. 2. For example, a network may be formed according to 802.11b/g/n, a subsequent evolution, etc. Electronic devices in a network may form a point-to-point connection or a point-to-multipoint connection.

Before a method for synchronizing clocks of processors according to an embodiment herein is described, a hardware structure of an electronic device according to an embodiment herein is described as follows.

Figure 3A:
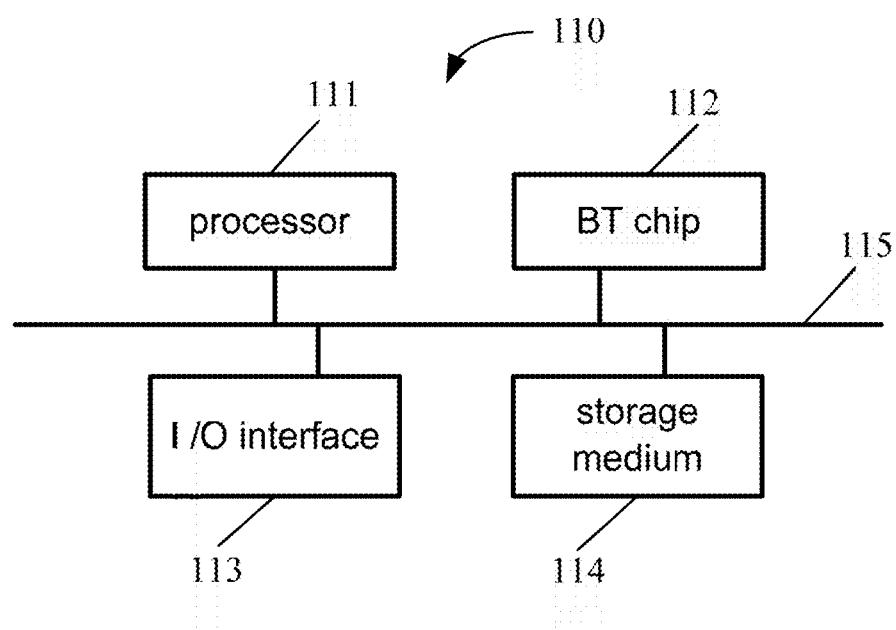
FIG. 3A is a diagram of a hardware structure of a BT device according to an embodiment herein.

FIG. 1A shows a BT device 110 in a network formed according to BT technology. FIG. 3A is a diagram of a hardware structure of the BT device 110 according to an embodiment herein. The BT device 110 may be provided with a processor 111 and a BT chip 112. The BT device 110 may further be provided with an Input/Output (I/O) interface 113 (such as one or more of a display, a keyboard, a touch screen, a speaker, a microphone, etc.) and/or a storage medium 114, as needed. A said component may transceive data and instructions through a bus 115, which may take on various forms, such as a Host Controller Interface (HCI).

Figure 3B:
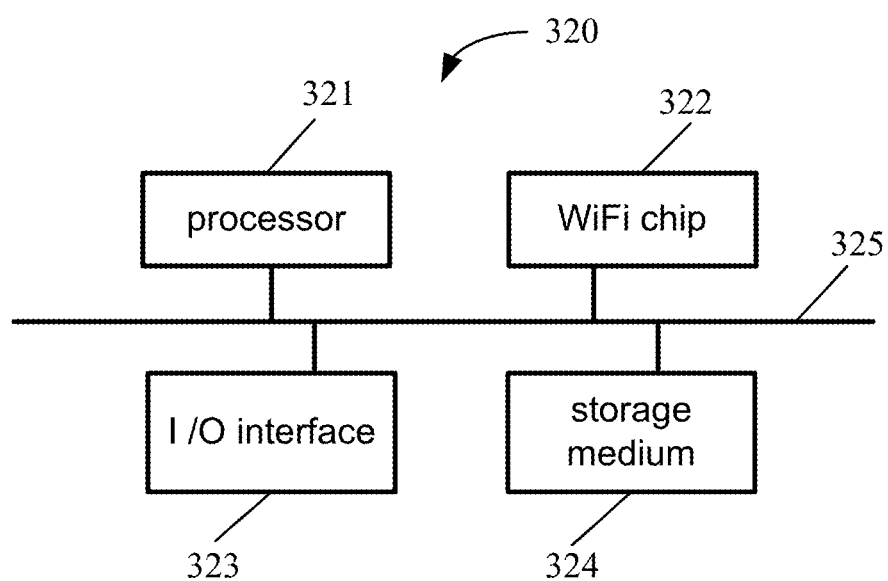
FIG. 3B is a diagram of a hardware structure of a WiFi device according to an embodiment herein.

FIG. 2 shows a WiFi device 320 in a network formed according to WLAN technology. FIG. 3B is a diagram of a hardware structure of a WiFi device 320 according to an embodiment herein. The WiFi device 320 may be provided with a processor 321 and a WiFi chip 322. The WiFi device 320 may further be provided with an I/O interface 323 (such as one or more of a display, a keyboard, a touch screen, a speaker, a microphone, etc.) and/or a storage medium 324, as needed. A said component may transceive data and instructions through a bus 325, which may take on various forms.

With a method for synchronizing clocks of processors according to an embodiment herein that applies to a network such as one formed by connecting at least two electronic devices (such as BT devices and WLAN devices), clocks of processors of the electronic devices may be synchronized efficiently and accurately.

Note that a term "first", "second", etc., such as in a first electronic device and a second electronic device in the network, may be used but to distinguish one electronic device from another, instead of referring to a specific electronic device. In a method for synchronizing clocks of processors according to an embodiment herein, synchronization may be done by setting a reference for clocks of processors. That is, a clock of a processor of an electronic device in a network may be set as a reference (benchmark or base), and a clock of a processor of any peer electronic device (other than the electronic device) in the network may be adjusted to be synchronized with the clock of the processor of the electronic device.

An example is described below, where a clock of a processor of a first electronic device in a network is taken as a reference, and a clock of a processor of a second electronic device in the network is adjusted to be synchronized with the clock of the processor of the first electronic device. Those skilled in the art may easily implement processor clock synchronization by taking the clock of the processor of the second electronic device as a reference based on description as follows.

Figure 4:
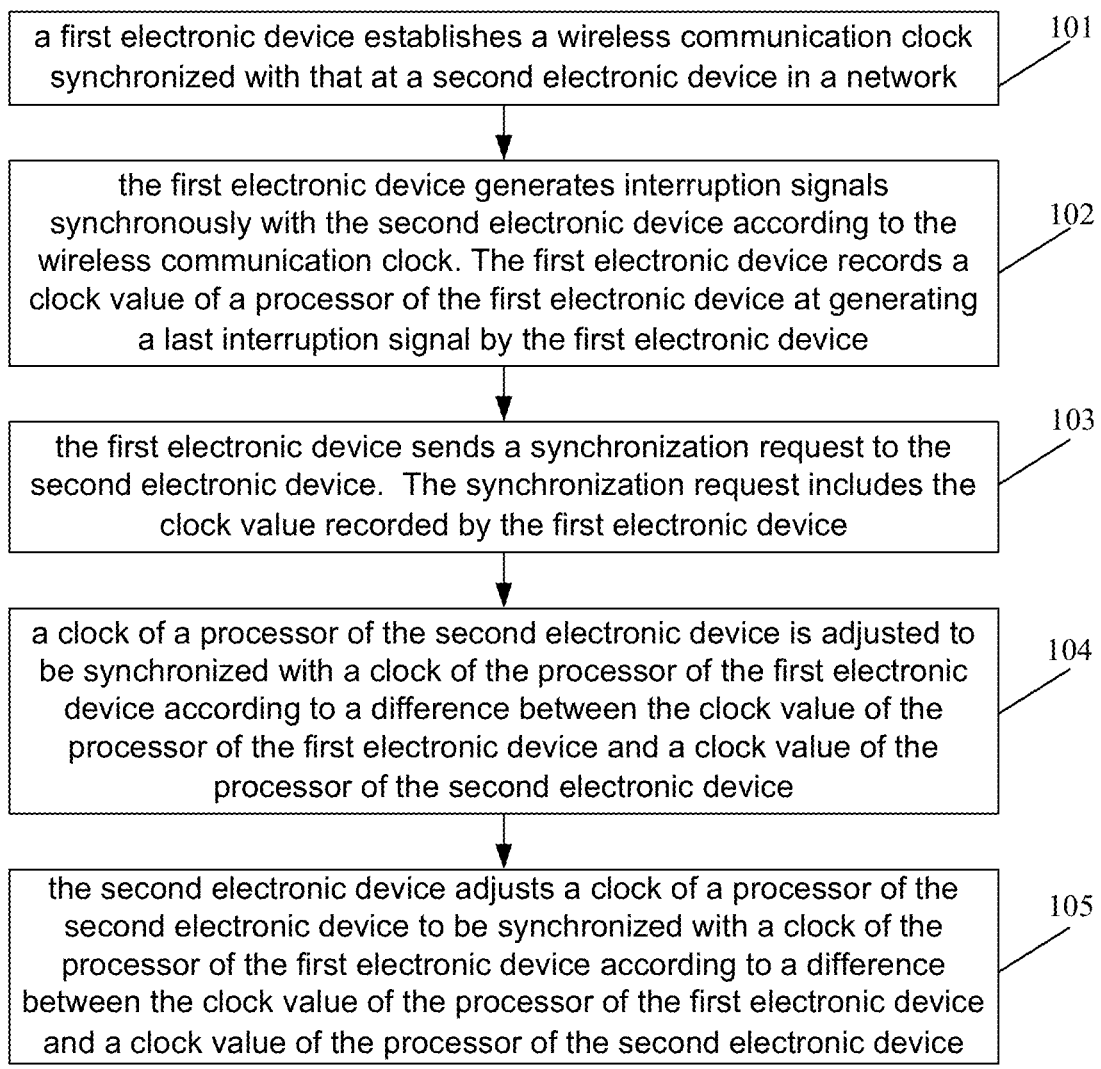
FIG. 4 is a flowchart of a method for synchronizing clocks of processors according to an embodiment herein.

FIG. 4 is a flowchart of a method for synchronizing clocks of processors according to an embodiment herein. A first electronic device and a second electronic device may form a network for wireless communication through BT technology or WLAN technology, and communicate in the network directly. To adjust the clock of the processor of the second electronic device to be synchronized with the clock of the processor of the first electronic device, FIG. 4 may include steps as follows.

In step 101, a first electronic device establishes a wireless communication clock synchronized with that at a second electronic device in a network.

Referring to the description of FIG. 1B, a piconet is formed by a first electronic device and a second electronic device. The electronic devices provided with BT chips establish piconet clock synchronization according to a mode of FIG. 1B. Since a wireless communication clock of an electronic device is a local clock of a built-in BT chip, communication clock synchronization may be established independent of the clocks of the processors of the electronic devices.

Referring to the description of FIG. 2, the first electronic device and the second electronic device may be connected to form a network according to WLAN technology. The electronic devices (provided with WLAN chips) accessing an access device (such as a wireless router or a wireless AP) in the WLAN may receive beacons sent by the access device at regular intervals (every 102.4 ms, for example) according to a WiFi protocol. The first electronic device to the third electronic device may take the beacons received synchronously as signals of the synchronized WiFi clocks.

In step 102, the first electronic device generates interruption signals synchronously with the second electronic device according to the wireless communication clock. The first electronic device records a clock value of a processor of the first electronic device at generating a last interruption signal by the first electronic device.

The first electronic device and the second electronic device are in one piconet and thus may establish a synchronized piconet clock. The BT chip of each (of the first electronic device and the second) electronic device may generate an interruption signal and send it to the processor thereof every predetermined number of periods of the piconet clock. The processor of the each electronic device may record, according to the clock of the processor, the time (i.e., the clock value of the processor) when the interruption signal is generated.

A first electronic device and a second electronic device may form a network according to WLAN technology. The WiFi clock of the WiFi chip of each (of the first electronic device and the second) electronic device may output an interruption signal to the processor thereof at a predetermined interval (such as a predetermined number of beacons). The processor of the each electronic device may record, according to the clock of the processor, the time (i.e., the clock value of the processor) when the interruption signal is generated.

In step 103, the first electronic device sends a synchronization request to the second electronic device. The synchronization request includes the clock value of the processor of the first electronic device recorded when the last interruption signal is generated by the first electronic device.

In step 104, the second electronic device receives the synchronization request sent by the first electronic device, and extracts the clock value recorded by the first electronic device.

The clock value recorded by the first electronic device time may be time of generating an interruption signal according to the clock of the processor of the first electronic device when the first electronic device generates interruption signals synchronously with the second electronic device based on the wireless communication clock.

In step 105, the second electronic device adjusts a clock of a processor of the second electronic device to be synchronized with a clock of the processor of the first electronic device according to a difference between the clock value of the processor of the first electronic device and a clock value of the processor of the second electronic device.

Referring to FIG. 1A, the BT device 110 and the BT device 120 may form a piconet, establish a synchronized piconet clock, synchronously generate interruption signals every predetermined number of periods of the piconet clock, and record respective clock values of processors when respective last interruption signals are generated. The clock of the BT device 110 may be taken as the reference. The BT device 120 may adjust the clock of the processor of the BT device 120 to be synchronized with the clock of the processor of the BT device 110 according to the difference between the clock value recorded by the BT device 120 and the clock value recorded by the BT device 110.

To synchronize clocks of processors of WiFi devices in FIG. 2, any two WiFi devices may establish WiFi clocks synchronized according to beacons, synchronously generate interruption signals every predetermined number of periods of the WiFi clocks, and record respective clock values of processors when respective last interruption signals are generated. The clock of the processor of the WiFi device 320 may be taken as the reference. The WiFi device 330 may adjust the clock of the processor of the WiFi device 330 to be synchronized with the clock of the processor of the WiFi device 320 according to the difference between the clock value recorded by the WiFi device 330 and the clock value recorded by the WiFi device 320.

It may be seen that, to synchronize the clock of the processor of the second electronic device with the clock of the processor of the first electronic device, each of the first electronic device and the second electronic device may record a clock value of generating a local interruption signal according to the clock of the respective processor. Since the first electronic device and the second electronic device generate the interruption signals synchronously according to the synchronized wireless communication clocks, the following may be seen.

On one hand, the second electronic device may acquire the difference between the clock value of an interruption signal recorded by the second electronic device according to the clock of the processor of the second electronic device and the clock value of an interruption signal recorded by the first electronic device according to the clock of the processor of the first electronic device; and an accurate offset of the clock of the processor of the first electronic device with respect to the clock of the processor of the second electronic device may be acquired, thereby allowing accurate synchronization of the clocks of the processors.

On the other hand, compared to the existing art where clocks of processors are synchronized by reading clocks of respective processors, determining an amount by which the clock is to be adjusted according to the readings, and adjusting the clocks accordingly, the second electronic device adjusts the clock of the processor per se according to the difference between the clock values of the processors, avoiding a delay and a jitter of a clock of a processor caused by directly reading the clock of the processor, such that clocks of processors of the electronic devices may be synchronized more efficiently, with accuracy thereof guaranteed.

Description is made below regarding synchronization of clocks of processors of electronic devices, in a network including a first electronic device, a second electronic device, and third electronic device, where the clock of the processor of the first electronic device is taken as the reference. Synchronization of clocks of processors of more than three electronic devices in a network may be implemented analogously based on understanding of what described below.

Different modes of clock synchronization corresponding to different connection of electronic devices in a network may be described below.

In a first case, electronic devices may be connected to form a network, such as a piconet, a scattered network, etc., according to BT technology.

1.1) The electronic devices may be connected to form a scattered network of at least two piconets connected to each other by a sequential point-to-point connection, such as of a first electronic device to a second electronic device and then to a third electronic device.

Figure 5A:
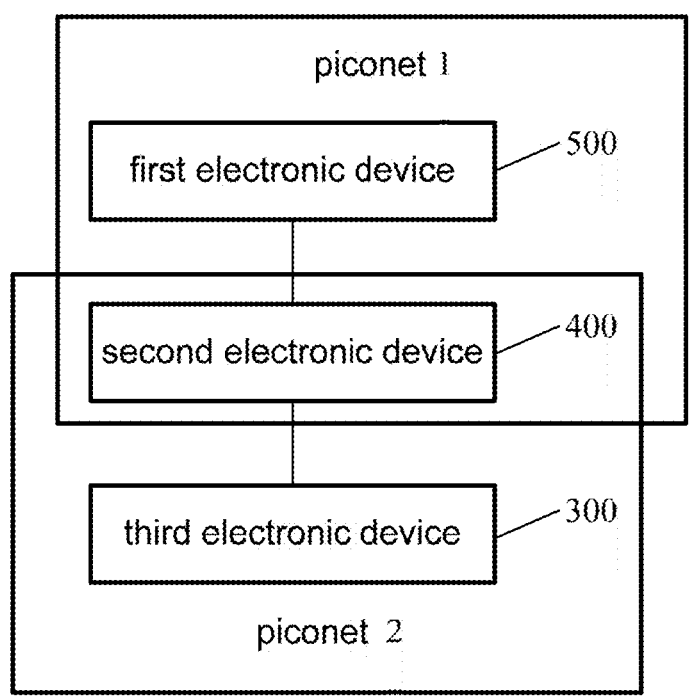
FIG. 5A is a diagram of connection of a first electronic device to a second electronic device and then a third electronic device in a network according to an embodiment herein.

FIG. 5A is a diagram of connection of a first electronic device to a second electronic device and then a third electronic device in a network according to an embodiment herein. The first electronic device 500 may be connected to the second electronic device 400 to form a piconet 1. The second electronic device 400 may be connected to the third electronic device 300 to form another piconet 2. The piconet 1 may be connected to the piconet 2 through the second electronic device 400 to form a scattered network. The second electronic device 400 in the piconet 1 plays a role different from a role it plays in the piconet 2. For example, the second electronic device 400 may be a master in the piconet 2, and a slave in the piconet 1.

Two piconets are involved. The first electronic device 500 and the second electronic device 400 in the piconet 1 establish a synchronized clock of the piconet 1. The second electronic device 400 and the third electronic device 300 in the piconet 2 establish a synchronized clock of the piconet 2. The clock 1 of the piconet 1 may differ from the clock of the piconet 2. For example, clock periods thereof may start at different points of time.

The first electronic device 500 and the second electronic device 400 synchronously generate interruption signals according to the clock of the piconet 1, and respectively record clock values of the processors thereof when the interruption signals are generated. The second electronic device 400 and the third electronic device 300 synchronously generate interruption signals according to the clock of the piconet 2, and respectively record clock values of the processors thereof when the interruption signals are generated.

According to the sequential connection of the electronic devices as shown in FIG. 5A, the first electronic device 500 may synchronize the clocks of the processors thereof sequentially. The clock of the processor of the first electronic device 500 may be taken as the reference. The second electronic device 400 may adjust the clock of the processor per se to be synchronized with the clock of the processor of the first electronic device 500. Then, the third electronic device 300 may adjust the clock of the processor per se to be synchronized with the clock of the processor of the second electronic device 400.

For the second electronic device 400 to adjust the clock of the processor per se to be synchronized with the clock of the processor of the first electronic device 500, the clock values of the respective processors at generating the synchronous interruption signals according to the clock of the piconet 1 may be recorded, and the second electronic device 400 may adjust the clock of the processor of the second electronic device 400 to be synchronized with the clock of the processor of the first electronic device 500 according to the difference between the clock value recorded per se and that recorded by the first electronic device 500.

For the third electronic device 300 to adjust the clock of the processor per se to be synchronized with the clock of the processor of the second electronic device 400, the clock values of the respective processors at generating the synchronous interruption signals according to the clock of the piconet 2 may be recorded, and the third electronic device 500 may adjust the clock of the processor of the third electronic device 500 to be synchronized with the clock of the processor of the second electronic device 400 according to the difference between the clock value recorded per se and that recorded by the second electronic device 400.

1.2) A piconet may include electronic devices connected by a point-to-multipoint connection, with a first electronic device being taken as a master, where for example, a first electronic device may be connected to both a second electronic device and a third electronic device.

Figure 5B:
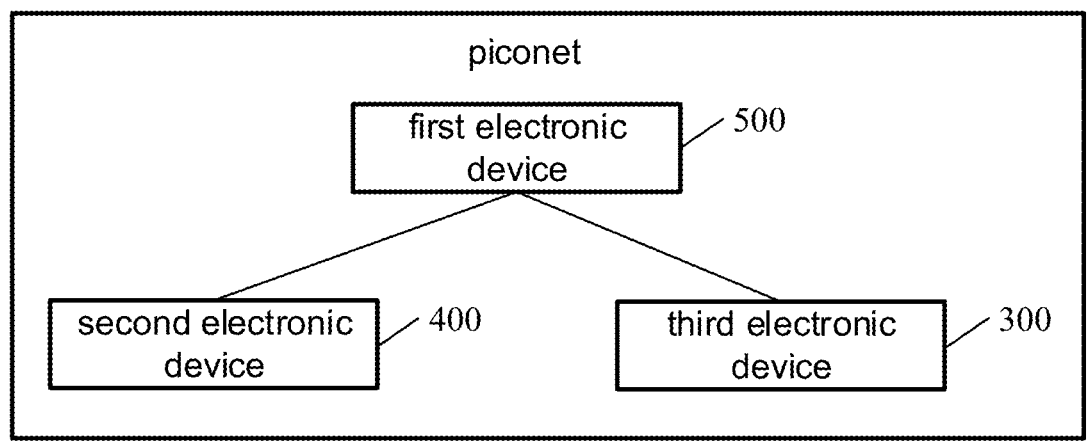
FIG. 5B is a diagram of connection of a first electronic device to a second electronic device and a third electronic device in a network according to an embodiment herein.

FIG. 5B is a diagram of connection of a first electronic device to a second electronic device and a third electronic device in a network according to an embodiment herein. The first electronic device 500 may be connected to both the second electronic device 400 and the third electronic device 300 to form one piconet. The first electronic device 500 as a master may be connected respectively to both the second electronic device 400 and the third electronic device 300 as slaves. Therefore, one synchronized piconet clock may be established for the electronic devices, as they are located in the same piconet.

There is but one piconet. Thus, the three electronic devices in the piconet may establish synchronization according to one clock. That is, the same synchronized clock of the piconet may be established for the first electronic device 500 and the second electronic device 400 as well as for the first electronic device 500 and the third electronic device 300.

According to the connection as shown in FIG. 5B, the clock of the processor of the first electronic device may be taken as the reference. The second electronic device may adjust the clock of the processor per se to be synchronized with the clock of the processor of the first electronic device. The third electronic device may adjust the clock of the processor per se to be synchronized with the clock of the processor of the second electronic device. Synchronization of the clock of the processor of the second electronic device may be independent of synchronization of the clock of the processor of the third electronic device. For example, they may be performed synchronously or asynchronously.

For the second electronic device 400 to adjust the clock of the processor per se to be synchronized with the clock of the processor of the first electronic device 500, the clock values of the respective processors at generating the synchronous interruption signals according to the clock of the piconet may be recorded, and the second electronic device 400 may adjust the clock of the processor of the second electronic device 400 to be synchronized with the clock of the processor of the first electronic device 500 according to the difference between the clock value recorded per se and that recorded by the first electronic device 500.

For the third electronic device 300 to adjust the clock of the processor per se to be synchronized with the clock of the processor of the first electronic device 500, the clock values of the respective processors at generating the synchronous interruption signals according to the clock of the piconet may be recorded, and the third electronic device 300 may adjust the clock of the processor of the third electronic device 300 to be synchronized with the clock of the processor of the first electronic device 500 according to the difference between the clock value recorded per se and that recorded by the first electronic device 500.

As an example of networking the first electronic device, the second electronic device, and the third electronic device, each of the first electronic device, the second electronic device, and the third electronic device may be a smart sound device such as a microphone, a headset, etc. The electronic devices may form a piconet through BT technology. An electronic device in the piconet may transmit an audio stream by running A2DP.

According to A2DP, an electronic device in a piconet may serve as a source (SRC), i.e. a device outputting audio data, or as a sink (SNK), i.e. a device receiving audio data.

Figure 6A:
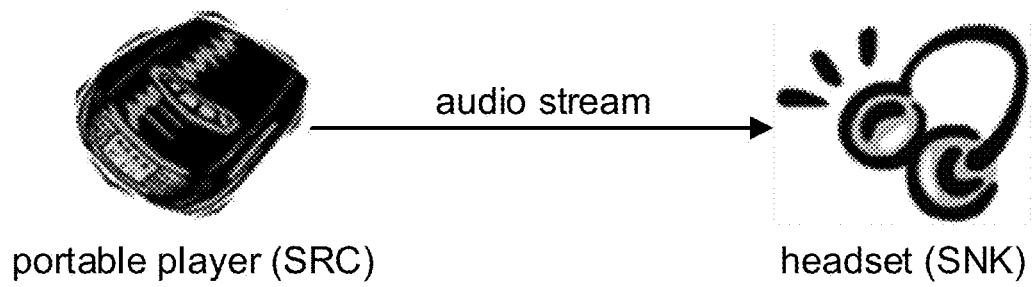
FIG. 6A is a diagram of audio stream transmission via an Advanced Audio Distribution Profile (A2DP) among devices in a piconet according to an embodiment herein.

FIG. 6A is a diagram of audio stream transmission via A2DP among devices in a piconet according to an embodiment herein. A portable player, serving as a SRC, may transmit an audio stream to a headset serving as a SNK.

Figure 6B:
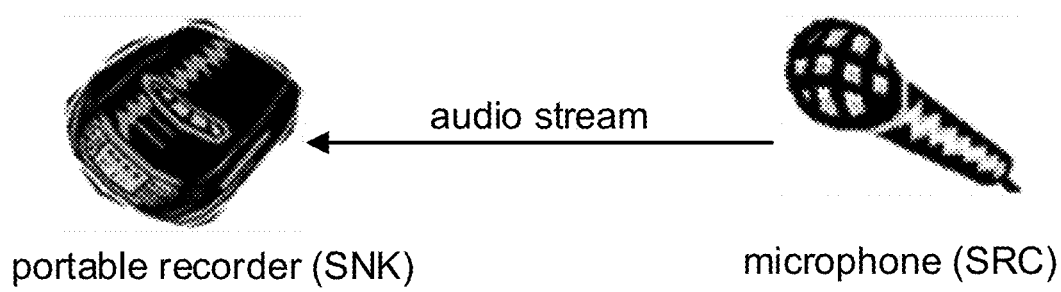
FIG. 6B is a diagram of audio stream transmission via A2DP among devices in a piconet according to an embodiment herein.

FIG. 6B is a diagram of audio stream transmission via A2DP among devices in a piconet according to an embodiment herein. A microphone, serving as a SRC, may transmit an acquired audio stream to a portable recorder serving as a SNK.

A piconet may include a SNK master and a SNK slave. According to a BT protocol, when a piconet is established, a SNK master may be a device enabling BT connection in the piconet, and any peer device in the piconet may be a SNK slave. After the piconet has been established, the SNK master and a SNK slave may swap their roles. A device as a reference to clocks of processors may be taken as the SNK master. A device of which the clock of the processor is to be adjusted may be taken as a SNK slave.

Figure 6C:
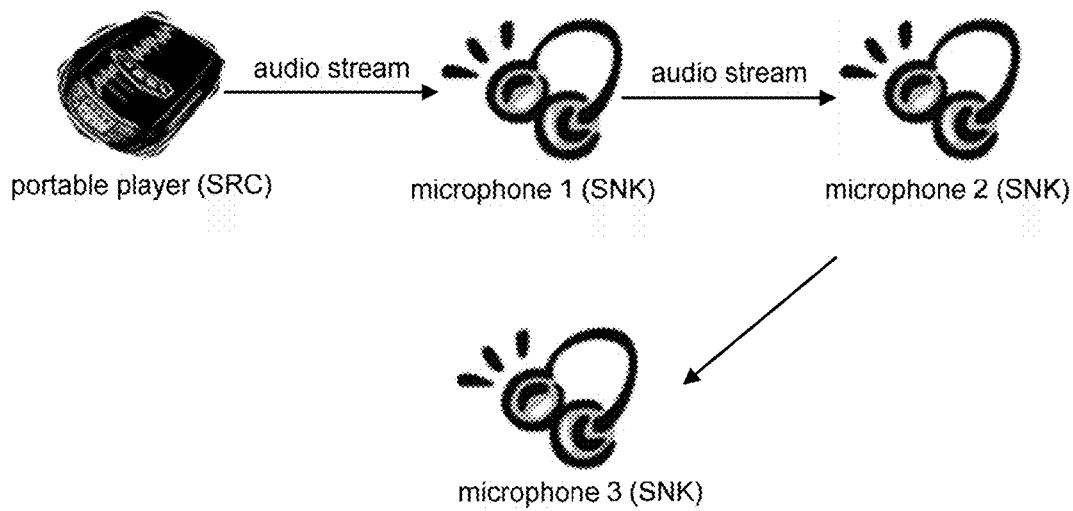
FIG. 6C is a diagram of audio stream transmission via A2DP among devices in a piconet according to an embodiment herein.

FIG. 6C is a diagram of audio stream transmission via A2DP among devices in a piconet according to an embodiment herein. A portable player may transmit an audio stream to a piconet formed by a microphone 1 to a microphone 3. The audio stream may be transmitted sequentially down the microphone 1, the microphone 2, and then the microphone 3. When the clock of the processor of the microphone 1 is taken as the reference, the microphone 1 may serve as the SNK master, and the microphone 2 may serve as a SNK slave. When the clock of the processor of the microphone 2 is taken as the reference, the microphone 2 may serve as the SNK master, and the microphone 3 may serve as a SNK slave.

According to the sequential connection of the microphone 1 through the microphone 3 as shown in FIG. 6C, to synchronize clocks of processors thereof, the clock of the processor of the microphone 1 may be taken as the reference, the clock of the processor of the microphone 2 may be adjusted to be synchronized with the clock of the processor of the microphone 1, in which case the microphone 1 may serve as the SNK master, and the microphone 2 and the microphone 3 may serve as SNK slaves. Then, the clock of the processor of the microphone 3 may be synchronized with the clock of the processor of the microphone 2, in which case the microphone 2 may serve as the SNK master, and the microphone 1 and the microphone 3 may serve as SNK slaves.

Note that a microphone in FIG. 6A to FIG. 6C may be replaced by a smart sound device such as a headset, a speaker, etc.

In a second case, electronic devices may be connected to form a network according to WLAN technology.

A first electronic device, a second electronic device, and a third electronic device may be connected sequentially by direct connection. The electronic devices may establish synchronization based on the clock of the same WLAN according to beacons transmitted by an access device.

2.1) The electronic devices in the WLAN may be connected by a sequential point-to-point connection, such as of a first electronic device to a second electronic device and then to a third electronic device.

According to the sequential connection of the electronic devices, the first electronic device may synchronize the clocks of the processors thereof sequentially. The clock of the processor of the first electronic device may be taken as the reference. The second electronic device may adjust the clock of the processor per se to be synchronized with the clock of the processor of the first electronic device. Then, the third electronic device may adjust the clock of the processor per se to be synchronized with the clock of the processor of the second electronic device.

The first electronic device to the third electronic device may synchronously generate interruption signals according to the synchronized clock of the WLAN, and record respective clock values at generating the synchronous interruption signals according to clocks of respective processors per se.

Then, for the second electronic device to adjust the clock of the processor per se to be synchronized with the clock of the processor of the first electronic device, the clock values of the respective processors at generating the synchronous interruption signals according to the clock of the WLAN may be recorded, and the second electronic device may adjust the clock of the processor of the second electronic device to be synchronized with the clock of the processor of the first electronic device according to the difference between the clock value recorded per se and that recorded by the first electronic device.

Then, for the third electronic device to adjust the clock of the processor per se to be synchronized with the clock of the processor of the second electronic device, the clock values of the respective processors at generating the synchronous interruption signals according to the clock of the WLAN may be recorded, and the third electronic device may adjust the clock of the processor of the third electronic device to be synchronized with the clock of the processor of the second electronic device according to the difference between the clock value recorded per se and that recorded by the second electronic device.

2.2) The electronic devices in the WLAN may be connected by a point-to-multipoint connection, where for example, a first electronic device may be connected to both a second electronic device and a third electronic device.

According to the connection, the clock of the processor of the first electronic device may be taken as the reference. The second electronic device may adjust the clock of the processor per se to be synchronized with the clock of the processor of the first electronic device. The third electronic device may adjust the clock of the processor per se to be synchronized with the clock of the processor of the second electronic device. Synchronization of the clock of the processor of the second electronic device may be independent of synchronization of the clock of the processor of the third electronic device. For example, they may be performed synchronously or asynchronously.

The first electronic device to the third electronic device may synchronously generate interruption signals according to the synchronized clock of the WLAN, and record respective clock values at generating the synchronous interruption signals according to clocks of respective processors per se.

Then, for the second electronic device to adjust the clock of the processor per se to be synchronized with the clock of the processor of the first electronic device, the clock values of the respective processors at generating the synchronous interruption signals according to the clock of the WLAN may be recorded, and the second electronic device may adjust the clock of the processor of the second electronic device to be synchronized with the clock of the processor of the first electronic device according to the difference between the clock value recorded per se and that recorded by the first electronic device.

Then, for the third electronic device to adjust the clock of the processor per se to be synchronized with the clock of the processor of the first electronic device, the clock values of the respective processors at generating the synchronous interruption signals according to the clock of the WLAN may be recorded, and the third electronic device may adjust the clock of the processor of the third electronic device to be synchronized with the clock of the processor of the first electronic device according to the difference between the clock value recorded per se and that recorded by the first electronic device.

As an example of networking the first electronic device, the second electronic device, and the third electronic device, each of the first electronic device, the second electronic device, and the third electronic device may be a smart sound device such as a microphone, a headset, etc. The electronic devices may form a WLAN through WLAN technology, such as WiFi technology.

Figure 8:
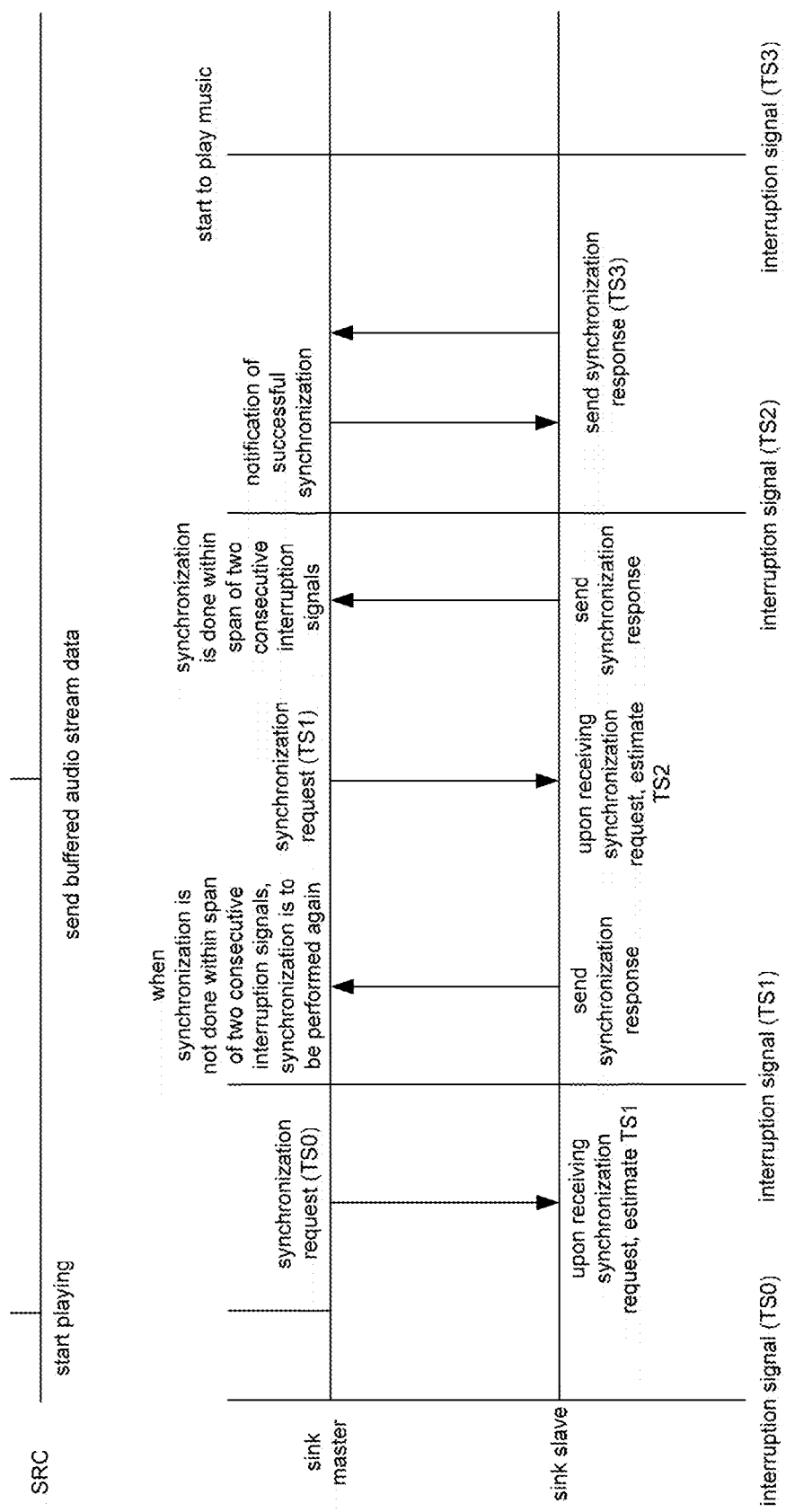
FIG. 8 is a diagram of a time sequence of synchronizing clocks of processors of a first electronic device and a second electronic device according to an embodiment herein.

FIG. 8 is a diagram of a time sequence of synchronizing clocks of processors according to an embodiment herein. With reference to steps as follows, the network may include a first electronic device, a second electronic device, and third electronic device connected sequentially. Synchronization may be done taking the clock of the processor of the first electronic device as the reference. Synchronization of clocks of processors of more than three electronic devices in a network may be implemented analogously based on understanding of what described below by those skilled in the art.

Figure 7:
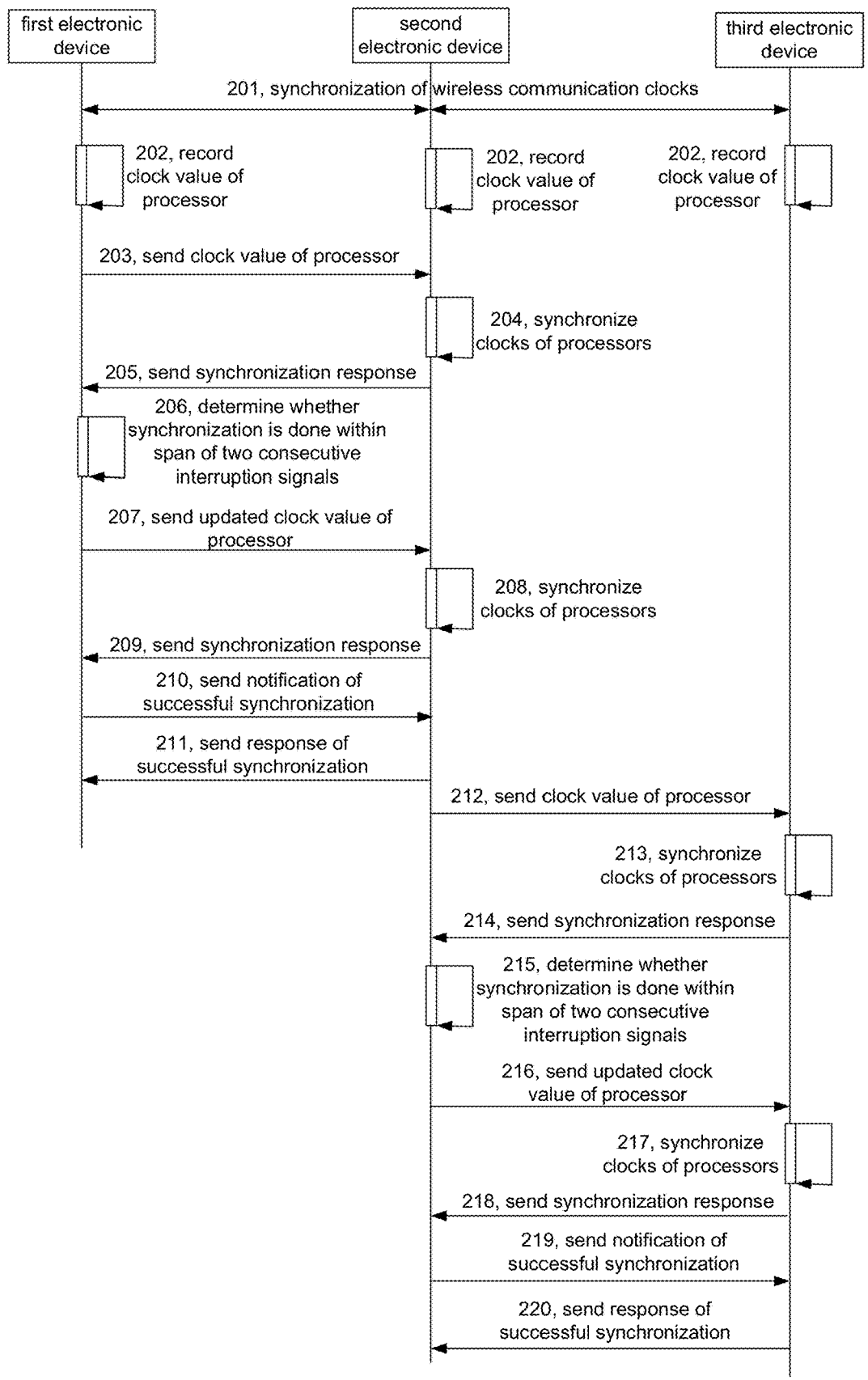
FIG. 7 is a flowchart of synchronizing clocks of processors in a network of at least three electronic devices according to an embodiment herein.

FIG. 7 is a flowchart of synchronizing clocks of processors in a network of three electronic devices according to an embodiment herein, which may include steps as follows.

In step 201, the first electronic device, the second electronic device, and the third electronic device may establish synchronized wireless communication clocks of the electronic devices.

Referring to the description of FIG. 1B, the first electronic device, the second electronic device, and the third electronic device may be connected to form a network, such as a piconet, a scattered network, etc., according to BT technology. BT chips of the first electronic device and the second electronic device may establish a synchronized clock of the piconet 1 (including the first electronic device and the second electronic device) according to a mode of FIG. 1B. BT chips of the second electronic device and the third electronic device may establish a synchronized clock of the piconet 2 (including the second electronic device and the third electronic device) according to a mode of FIG. 1B. Since a clock of a piconet is a local clock of a built-in BT chip of an electronic device, piconet clock synchronization may be established independent of the clocks of the processors of the electronic devices.

Referring to the description of FIG. 2, the first electronic device, the second electronic device, and the third electronic device may be connected to form a network according to WLAN technology. The electronic devices(provided with WLAN chips) accessing an access device (such as a wireless router or a wireless AP) in the WLAN may receive beacons sent by the access device at regular intervals (every 102.4 ms, for example) according to a WiFi protocol. The first electronic device to the third electronic device may take the beacons received synchronously as signals of the synchronized WiFi clocks, thereby establishing synchronized WiFi clocks.

In step 202, the first electronic device to the third electronic device may synchronously generate interruption signals according to the wireless communication clocks, and each record a respective clock value at generating the synchronous interruption signals according to the clock of the respective processor per se.

The first electronic device, the second electronic device, and the third electronic device may be connected to form a network, such as a piconet, a scattered network, etc., according to BT technology. The BT chip of each (of the first electronic device, the second electronic device, and the third) electronic device may generate an interruption signal and send it to the processor thereof every predetermined number of periods of the BT clock (such as the clock of the piconet or the clock of the scattered network). The processor of the each electronic device may record, according to the clock of the processor, the time (i.e., the clock value of the processor) when the interruption signal is generated.

For example, the BT chip of the first electronic device may have established synchronization with the second electronic device based on the clock of the piconet 1. The BT chip of the first electronic device may output an interruption signal to the processor per se every predetermined number of clocks of the piconet 1. The processor of the first electronic device may record, according to the clock of the processor, the time (i.e., the clock value of the processor) when the interruption signal is generated. The BT chip of the second electronic device may have established synchronization with the third electronic device based on the clock of the piconet 2. The BT chip of the first electronic device may output an interruption signal to the processor per se every predetermined number of cycles of the clock of the piconet 1. The processor of the first electronic device may record, according to the clock of the processor, the time (i.e., the clock value of the processor) when the interruption signal is generated.

The first electronic device, the second electronic device, and the third electronic device may be connected to form a network according to WLAN technology. The WiFi clock of the WiFi chip of each (of the first electronic device, the second electronic device, and the third) electronic device may output an interruption signal to the processor thereof at a predetermined interval (such as a predetermined number of beacons). The processor of the each electronic device may record, according to the clock of the processor, the time (i.e., the clock value of the processor) when the interruption signal is generated.

The WiFi chip of the first electronic device may have established WiFi clock synchronization with any peer electronic device (the second electronic device and the third electronic device) in the network. That is, beacons sent by the access device may be received at fixed intervals. The WiFi chip of the first electronic device may output an interruption signal to the processor thereof upon receiving a predetermined number of beacons. The processor of the first electronic device may record, according to the clock of the processor, the time (i.e., the clock value of the processor) when the interruption signal is generated.

In step 203, the first electronic device may send, to the second electronic device, a synchronization request including a clock value of the processor thereof recorded when the last interruption signal is generated in the first electronic device according to the clock of the piconet 1.

FIG. 8 is a diagram of a time sequence of synchronizing clocks of processors of a first electronic device and a second electronic device according to an embodiment herein. The SNK master may be the first electronic device. A SNK slave may be the second electronic device. After interruption signals TS0 have been synchronously generated in the first electronic device and the second electronic device, the first electronic device may send, to the second electronic device, a synchronization request including a clock value of the processor recorded by the first electronic device for the TS0. Since the first electronic device and the second electronic device are located in the piconet 1, interruption signals may be synchronously generated in the first electronic device and the second electronic device according to the clock of the piconet 1.

In step 204, the second electronic device adjusts a clock of a processor of the second electronic device to be synchronized with a clock of the processor of the first electronic device according to a difference between the clock value of the processor of the first electronic device and a clock value of the processor of the second electronic device.

Referring to FIG. 8, the TS0

At generating the synchronous interruption signals (TS0) in the first electronic device and the second electronic device according to the clock of the piconet 1, a system clock value of the first electronic device may be 23 h:23 m:24 s, a system clock value of the second electronic device may be 23 h:23 m:25 s. This means that the clock of the second electronic device is 1 second ahead of the clock of the first electronic device. Therefore, the clock of the second electronic device may be delayed by 1 second.

In step 205, the second electronic device may send a synchronization response to the first electronic device.

Note that since the first electronic device may send the synchronization response and perform processor clock synchronization instantly, step 205 and step 204 may be executed in any sequence. That is, the second electronic device may perform processor clock synchronization and send the synchronization response to the first electronic device synchronously or asynchronously.

For example, the second electronic device may perform processor clock synchronization after receiving the processor clock value sent by the first electronic device, and then send the synchronization response to the second electronic device. In another example, the second electronic device may first send the synchronization response to the first electronic device. Then, the second electronic device may perform processor clock synchronization after receiving the processor clock value sent by the first electronic device. In another example, the second electronic device may send the synchronization response to the first electronic device while performing processor clock synchronization upon receiving the processor clock value sent by the first electronic device.

In step 206, upon receiving the synchronization response, the first electronic device may determine whether the second electronic device has completed processor clock synchronization within an interval spanned by two consecutive interruption signals (generated according to the clock of the piconet including both the first electronic device and the second electronic device). If so, the flow may go to step 210. Otherwise, the flow may go to step 207.

Referring to FIG. 8, after interruption signals TS0 have been synchronously generated in the first electronic device and the second electronic device, the first electronic device may send, to the second electronic device, the processor clock value recorded by the first electronic device corresponding to the TS0, to allow the second electronic device to compare it with a clock value recorded corresponding to the interruption signal TS0 synchronously generated in the second electronic device. However, at this moment, interruption signals TS1 have been synchronously generated in the first electronic device and the second electronic device according to the clock of the piconet 1. In this case, the second electronic device may compute the difference between the processor clock value per se corresponding to the interruption signal TS1 and the processor clock value (corresponding to the interruption signal TS0) sent by the first electronic device and perform processor clock synchronization according to the difference, leading to a major deviation in synchronization.

Therefore, upon receiving the synchronization response, the first electronic device may determine whether the last processor clock value sent to the second electronic device equals the clock value of the processor recorded at generating the last interruption signal. If so, the first electronic device may determine that the second electronic device has completed processor clock synchronization within an interval spanned by two consecutive interruption signals.

Referring to FIG. 8, upon receiving the synchronization response sent by the second electronic device, the second electronic device may discover that the clock value of the processor recorded at generating the last interruption signal TS1 does not equal the last processor clock value sent to the second electronic device corresponding to the interruption signal TS0. It may then be determined that the second electronic device has not completed processor clock synchronization within the span of two consecutive interruption signals. The second electronic device may again be requested to perform processor clock synchronization.

In step 207, the first electronic device may determine that the second electronic device has not completed processor clock synchronization within the span of two consecutive interruption signals. The first electronic device may send an updated synchronization request to the second electronic device.

An updated clock value in the updated synchronization request sent by the first electronic device may be the updated clock value of the processor of the first electronic device at generating the last interruption signal according to the clock of the piconet 1.

Referring to FIG. 8, after sending the processor clock value corresponding to the interruption signal TS0 to the first electronic device, the first electronic device may determine, according to the synchronization response sent by the second electronic device, that processor clock synchronization has not be done within the span of two consecutive interruption signals, and send the updated synchronization request to the second electronic device. The updated synchronization request may include the processor clock value recorded at generating the last interruption signal (TS1) in the first electronic device according to the clock of the piconet 1.

In step 208, the second electronic device may adjust the clock of the processor of the second electronic device to be synchronized with the clock of the processor of the first electronic device according to the difference between the updated clock value of the processor sent by the first electronic device and the clock value of the processor of the second electronic device recorded at generating the last interruption signal according to the wireless communication clock.

Referring to FIG. 8, the first electronic device may compute the difference between the clock value of the processor recorded at generating the last synchronization signal (TS1) in the first electronic device according to the clock of the piconet 1 and the clock value of the processor corresponding to the last interruption signal (TS1) in the second electronic device according to the clock of the piconet 1, and adjust the clock of the processor of the second electronic device to be synchronized with the clock of the processor of the first electronic device according to the difference.

In step 209, the flow may return to step 205 to send a synchronization response to the first electronic device.

Referring to FIG. 8, upon receiving the second synchronization response sent by the first electronic device, the first electronic device may determine whether the clock value of the processor recorded at generating the last interruption signal in the first electronic device according to the clock of the piconet 1 equals the last processor clock value sent to the second electronic device. If so, it may be determined that the second electronic device has completed processor clock synchronization within the span of two consecutive interruption signals. Otherwise it may be determined that the second electronic device has not completed processor clock synchronization within the span of two consecutive interruption signals.

In FIG. 8, after the first electronic device has sent, to the second electronic device, the processor clock value recorded corresponding to the interruption signal (TS1), while the second electronic device is performing synchronization and sending the synchronization response, no new interruption signal has been synchronously generated by the first electronic device and the second electronic device according to the clock of the piconet 1. Therefore, after receiving the synchronization response sent by the second electronic device, the second electronic device may discover that the clock value of the processor recorded corresponding to the last interruption signal TS1 according to the clock of the piconet 1 equals the last processor clock value sent to the second electronic device corresponding to the interruption signal TS1. That is, it may be determined that the second electronic device has completed processor clock synchronization within the span of two consecutive interruption signals.

In step 210, when determining that the second electronic device has completed processor clock synchronization within the span of two consecutive interruption signals, the first electronic device may send a notification of successful synchronization to the second electronic device.

In step 211, the second electronic device may send a response of successful synchronization to the first electronic device.

Referring to FIG. 8, when a new interruption signal (TS2) has been generated in the first electronic device, the first electronic device may send a response to the notification of successful synchronization to the first electronic device, and receive a response of successful synchronization, which may be sent by the second electronic device before generating a new interruption signal (TS3).

In step 210 and step 211, the first electronic device may include a common task time in the notification of successful synchronization. The first electronic device may determine the common task time of the electronic devices in the network when the first electronic device determines that the second electronic device has completed processor clock synchronization within the span of two consecutive interruption signals and sends the notification of successful synchronization to the second electronic device. The common task time of the electronic devices in the network may be extracted from the notification of successful synchronization.

Referring to FIG. 6C, the BT devices may be connected to form the piconet according to BT technology such as A2DP. The microphone 1 serving as the master may include a starting time and an ending time of simultaneous playing of an audio stream in the notification of successful synchronization sent to the microphone 2 serving as a slave. Thus, the microphone 1 and the microphone 2 may start and end playing the audio stream simultaneously.

In step 210 and step 211, the second electronic device may determine the common task time of the electronic devices in the network when receiving the notification of successful synchronization sent by the first electronic device. The common task time of the electronic devices in the network may be included in the response of successful synchronization.

Referring to FIG. 6C, the BT devices may be connected to form the piconet according to BT technology such as A2DP. Upon receiving the notification of successful synchronization sent by the BT device 1 serving as the master, the microphone 2 serving as a slave device may include a starting time and an ending time of simultaneous playing of an audio stream in the response of successful synchronization sent to the microphone 2 serving as a slave. Thus, the microphone 1 and the microphone 2 may start and end playing the audio stream simultaneously.

It has been described that with the processor clock of the first electronic device being taken as the reference, the second electronic device may adjust the clock of the processor per se to be synchronized with the clock of the processor of the first electronic device by interaction between the first electronic device and the second r electronic device. To synchronize the clocks of the processors of the second electronic device and the third electronic device, the clock of the second electronic device may be taken as the reference, the second electronic device and the third electronic device may record the processor clock values at synchronously generating the last interruption signals according to the synchronized clock of the piconet 2. The third electronic device may adjust the clock of the processor per se to be synchronized with the clock of the processor of the second electronic device according to the difference between the recorded processor clock values, implementation of which is similar to synchronization of the clocks of the processors of the first electronic device and the second electronic device, and is briefly described below.

In step 212, the second electronic device may send, to the third electronic device, the synchronization request including the clock value of the processor thereof recorded when the last interruption signal is generated in the second electronic device according to the clock of the piconet 2.

In step 213, the third electronic device may adjust the clock of the processor of the third electronic device to be synchronized with the clock of the processor of the second electronic device according to the difference between the clock value of the processor sent by the second electronic device and the clock value of the processor thereof recorded when the last interruption signal is generated in the third electronic device according to the clock of the piconet 2.

In step 214, the third electronic device may send the synchronization response to the second electronic device.

Note that since the third electronic device may send the synchronization response and perform processor clock synchronization instantly, step 213 and step 214 may be executed in any sequence. That is, the third electronic device may perform processor clock synchronization and send the synchronization response to the second electronic device synchronously or asynchronously.

For example, the third electronic device may perform processor clock synchronization after receiving the processor clock value sent by the second electronic device, and then send the synchronization response to the third electronic device. In another example, the third electronic device may first send the synchronization response to the second electronic device. Then, the third electronic device may perform processor clock synchronization after receiving the processor clock value sent by the second electronic device. In another example, the third electronic device may send the synchronization response to the second electronic device while performing processor clock synchronization upon receiving the processor clock value sent by the first electronic device.

In step 215, the second electronic device may determine whether the second electronic device has completed processor clock synchronization within an interval spanned by two consecutive interruption signals generated according to the clock of the piconet 2. If so, the flow may go to step 218. Otherwise, the flow may go to step 216.

Upon receiving the synchronization response sent by the third electronic device, the second electronic device may determine whether the last processor clock value sent to the second electronic device equals the clock value of the processor recorded at generating the last interruption signal according to the clock of the piconet 2. If so, the second electronic device may determine that the third electronic device has completed processor clock synchronization within an interval spanned by two consecutive interruption signals. Otherwise, the second electronic device may determine that the third electronic device has not completed processor clock synchronization within the span of two consecutive interruption signals.

In step 216, the second electronic device may determine that the third electronic device has not completed processor clock synchronization within the span of two consecutive interruption signals. The second electronic device may send the updated synchronization request to the second electronic device.

The updated clock value in the updated synchronization request sent by the second electronic device may be the updated clock value of the processor of the second electronic device at generating the last interruption signal according to the clock of the piconet 2.

In step 217, the third electronic device may again adjust the clock of the processor of the third electronic device to be synchronized with the clock of the processor of the second electronic device according to the updated clock value of the processor sent by the second electronic device.

The third electronic device may adjust the clock of the processor of the third electronic device to be synchronized with the clock of the processor of the second electronic device according to the difference between the updated clock value of the processor sent by the second electronic device and the clock value of the processor of the third electronic device recorded at generating the last interruption signal according to the clock of the piconet 2.

In step 218, the third electronic device may send the synchronization response to the second electronic device.

In step 219, when determining that the third electronic device has completed processor clock synchronization within the span of two consecutive interruption signals, the second electronic device may send the notification of successful synchronization to the third electronic device.

In step 220, upon receiving the notification of successful synchronization sent by the second electronic device, the third electronic device may send the response of successful synchronization to the third electronic device.

In step 219 and step 220, the second electronic device may include a common task time in the notification of successful synchronization. The third electronic device may receive the notification of successful synchronization sent by the first electronic device, and extract the common task time of the electronic devices in the network from the notification of successful synchronization.

In step 219 and step 220, upon receiving the notification of successful synchronization sent by the second electronic device, the third electronic device may determine the common task time of the electronic devices in the network, and include the common task time of the electronic devices in the network in the response of successful synchronization.

With the steps, clocks of processors of the first electronic device, the second electronic device, and the third electronic device in the network have been synchronized. Synchronization of the clock of the processor of a fourth electronic device connected to the third electronic device may be implemented analogously according to synchronization of clocks of processors of the first electronic device and the second electronic device and synchronization of clocks of processors of the second electronic device and the third electronic device.

The electronic device in the network may execute, within a task time agreed on in a notification of synchronization completion or a response of synchronization completion according to the synchronized clocks of processors thereof, at least one of: starting a computation task; discarding a computation task; modifying a received computation task, etc.

By agreeing on the task time in the notification of synchronization completion or the response of synchronization completion, inter-device instruction exchange may be reduced, improving efficiency. However, the embodiments herein do not exclude additional inter-device exchange for agreeing on the task time. For example, the first electronic device may send, to the second electronic device, an instruction for negotiating the task time, and wait for a feedback by the second electronic device. The first electronic device may determine the task time designated by the second electronic device and then send a confirmation to the second electronic device.

A BT device (such as a smart sound device) in a piconet may synchronously play an audio stream at an agreed on playing starting time (according to a time stamp of a packet of the audio stream), discard one or more packets of the audio stream, synchronously fill in missing data found after decoding the received audio stream, etc., to ensure synchronous playing.

After the clocks of the processors of the electronic devices in the network have been synchronized, an electronic device may further calibrate the clock of the processor per se according to an acquired interruption signal, avoiding any jitter, as well as ensuring accuracy, of the clock of the processor per se.

For example, the second electronic device may record at least two instances of the interval spanned by two consecutive interruption signals generated by the second electronic device according to the clock of the processor of the second electronic device, set a reference span for determining the interval spanned by two consecutive interruption signals according to the recorded at least two instances, and calibrate the clock of the processor of the second electronic device according to the reference.

For example, a reference span may be taken as the average of last 20 instances of recording the interval spanned by two consecutive interruption signals generated by the second electronic device. The reference span may be subtracted from the difference between the clock values of the processor of the second electronic device corresponding to two consecutive interruption signals generated by the second electronic device. When the result (jitter offset) is greater than zero, it may indicate that a forward jitter has occurred to the clock of the processor as compared to the wireless communication clock. The clock of the processor may be adjusted backwards by an amount of time corresponding to the result. When the result is 1 s, the clock of the processor may be slowed down by 1 s. When the result is less than zero, it may indicate that a backward jitter has occurred to the clock of the processor as compared to the wireless communication clock. The clock of the processor may be adjusted forwards by an amount of time corresponding to the result. When the result is −1 s, the clock of the processor may be speed up by 1 s.

A peer electronic device in the network, such as the first electronic device, the second electronic device, etc., may calibrate the clock of the processor per se analogously according to processor clock calibration by the second electronic device. After the clocks of the processors of the electronic devices in the network have been synchronized, an electronic device may keep calibrating the clock of the processor per se according to an interruption signal generated per se, without the need of further inter-device instruction exchange, providing efficient implementation, saving inter-device communication resources.

An example is given below, where clocks of processors of BT devices in a piconet are synchronized. FIG. 6C involves the portable player and the microphones 1 through 3. The portable player may serve as a SRC for outputting an audio stream to the microphones. The microphones 1 through 3 may form piconets and serve as SNKs for receiving the audio stream.

The BT chip of the microphone 1 and the BT chip of the microphone 2 may form the piconet 1 and achieve synchronization according to the clock of the piconet 1. The BT chip of the microphone 2 and the BT chip of the microphone 3 may form the piconet 2 and achieve synchronization according to the clock of the piconet 2.

Taking the clock of the processor of the microphone 1 as the reference, to synchronize clocks of processors of the microphone 1 and the microphone 2, the microphone 1 may serve as the SNK master. The microphone 2 may serve as a SNK slave. The microphone 1 and the microphone 2 may synchronously output interruption signals according to the clock of the piconet 1, and record clock values recorded when the last synchronous interruption signals are generated according to the clock of the piconet 1. The microphone 2 may adjust the clock of the processor of the microphone 2 to be synchronized with the clock of the processor of the microphone 1 according to the difference between the clock values (the difference between the processor clock value recorded by the microphone 2 and the processor clock value recorded by the microphone 13).

To synchronize clocks of processors of the microphone 2 and the microphone 3, the microphone 2 may serve as the SNK master. The microphone 3 may serve as a SNK slave. The microphone 2 and the microphone 3 may synchronously output interruption signals according to the clock of the piconet 2, and record clock values recorded when the last synchronous interruption signals are generated according to the clock of the piconet 2. The microphone 3 may adjust the clock of the processor of the microphone 3 to be synchronized with the clock of the processor of the microphone 2 according to the difference between the clock values (the difference between the processor clock value recorded by the microphone 3 and the processor clock value recorded by the microphone 2).

The clock of the processor of a SNK slave may always be adjusted to be synchronized with the clock of the processor of the SNK master.

Illustrated below is an example where the clock of the processor of a SNK slave is adjusted to be synchronized with the clock of the processor of the SNK master.

Figure 9:
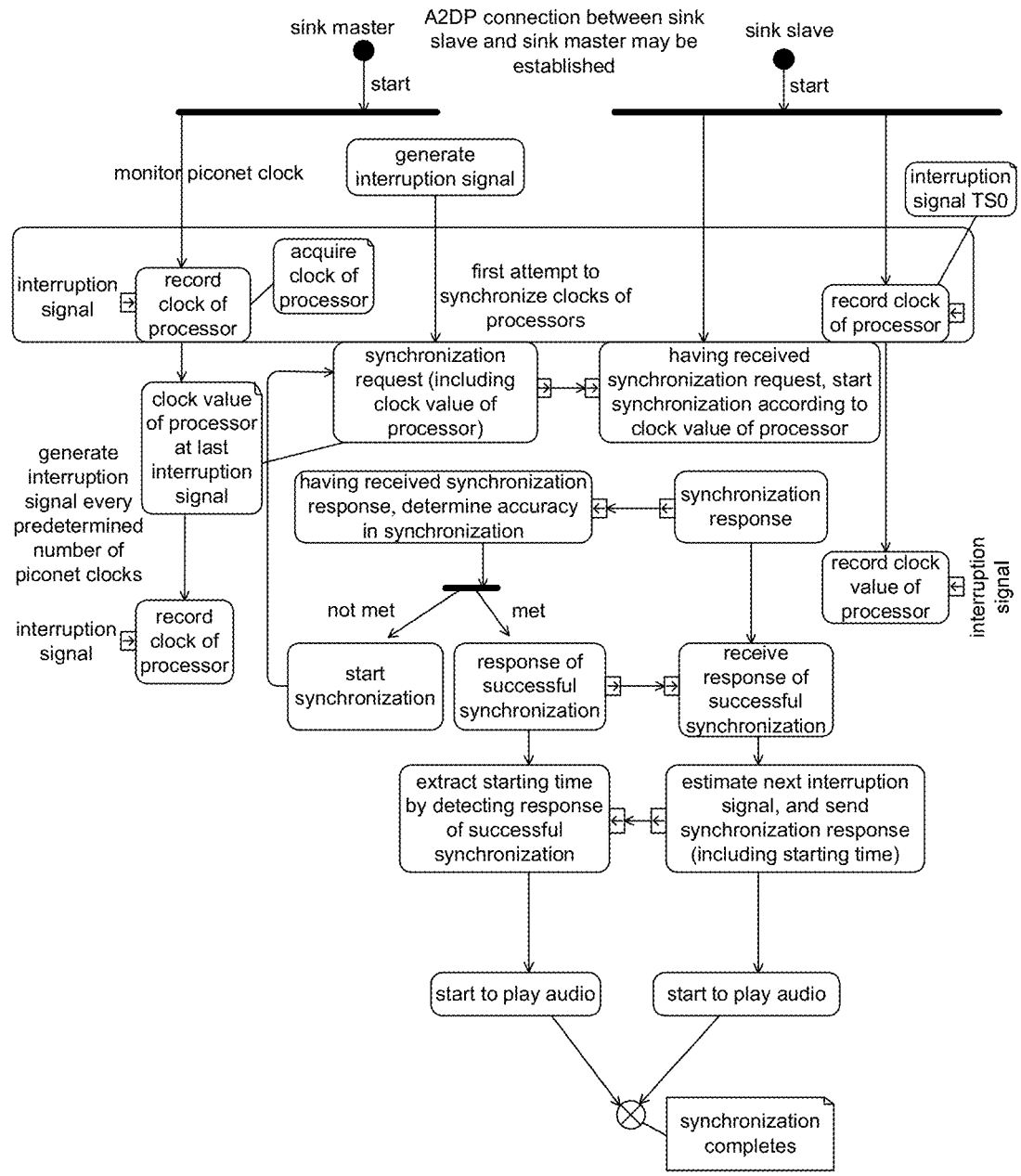
FIG. 9 is a flowchart of adjusting a clock of a processor of a sink (SNK) slave to be synchronized with a clock of a processor of a SNK master according to an embodiment herein.

FIG. 8 is a diagram of a time sequence of synchronizing the clock of the processor of a SNK slave with the clock of the processor of the SNK master. FIG. 9 is a flowchart of synchronizing the clock of the processor of a SNK slave with the clock of the processor of the SNK master according to an embodiment herein. The master may establish an A2DP connection with the slave. The master may serve as an A2DP SRC. The slave may serve as an A2DP SNK. The flow may include steps as follows.

In step 301, a SNK master and a SNK slave may be connected to form a piconet. A synchronized clock of the piconet may be established according to a BT protocol. The clock of the piconet may be a clock local to the BT chip of an electronic device independent of the clock of the processor of the electronic device.

In step 302, the processor (MCU, for example) of each of all SNKs, including the SNK master and the SNK slave, may send, to the BT chip thereof, a customized instruction (customer cmd, defined specifically in a BT chip for trigger generating, by the BT chip, an interruption signal). The BT chip then start generating an interruption signal to the processor side thereof at an interval of a number of cycles of the clock of the piconet.

In step 303, whenever the processor of the SNK master or slave receives an interruption signal, the SNK may record the time, namely the clock value of the processor per se, when the interruption signal is received according to the clock of the processor (namely, the processor clock) per se.

In step 304, the SRC, i.e. the portable player, may notify the SNK master to start playing music.

In step 305, the SNK master may initiate processor clock synchronization with the SNK slave. The SNK master may include, in a synchronization request (sync command) to be sent to the SNK slave, a parameter, i.e., a processor clock value t2 recorded corresponding to the last interruption signal (TS0) received.

In step 306, having received the synchronization request, the SNK slave may determine the difference between the processor clock value t1 recorded per se corresponding to the last interruption signal (TS0) and the processor clock value t2 received, and adjust the clock of the processor of the SNK slave to be synchronized with the clock of the processor of the SNK master according to the difference (t1–t2).

In step 307, the SNK slave may send a synchronization response to the SNK master.

Note that the processor clock synchronization and the synchronization response sending may be performed synchronously or asynchronously.

In step 308, having received the synchronization response sent by the SNK slave, the SNK master may determine whether the processor clock value recorded by the SNK master when the last interruption signal is generated equals the processor clock value sent to the SNK slave. If so, it means that processor clock synchronization at the SNK slave has been done within the span of two consecutive interruption signals and that the processor clock synchronization is successful, and the flow may continue at step 309. If they do not equal, it means that processor clock synchronization at the SNK slave has failed to be done within the span of two consecutive interruption signals. The flow may go back to step 305 to send an updated synchronization request to the SNK slave. The updated synchronization request may include an updated processor clock value recorded when the last interruption signal is generated. The flow may continue until processor clock synchronization at the SNK slave has not been done within the span of two consecutive interruption signals.

Referring to FIG. 8, the SNK master may discover that the system clock value t3 currently recorded corresponding to the last interruption signal (TS1) does not equal the processor clock value t2 (corresponding to the interruption signal TS0) sent to the SNK slave, it means that a new interruption signal (TS1) has been generated during processor clock synchronization at the SNK slave and that the processor clock synchronization has failed, and processor clock synchronization is to be performed again. Namely, step 305 to step 307 may be repeated until processor clock synchronization at the SNK slave has been done within the span of two interruption signals.

Herein, it is determined whether the synchronization is complete based on a principle as follows. In case the SNK slave receives the synchronization request after the interruption signal TS0, if the SNK slave and the SNK master synchronously generate new interruptions TS1 at this moment, the SNK slave may determine the difference between the processor clock value t4 recorded corresponding to the interruption signal (TS1) and the processor clock value t2 included in the received synchronization request to adjust the processor clock of the SNK slave using the difference (t2–t4), instead of using the difference (t2–t1). Thus, the processor clock of the SNK slave is adjusted incorrectly. The SNK master may avoid such an error using the mode of determination as described.

In step 309, the SNK master may send, to the SNK slave, a notification of synchronization completion indicating that the synchronization is successful.

In step 310, the SNK slave may send a response of successful synchronization to the SNK master.

In step 309 and step 310, the SNK master and the SNK slave may agree on a starting time for simultaneously starting of playing an audio. The starting time may be any moment according to the synchronized clocks of the processors, or time of generating an interruption signal (such as a first interruption generated after the synchronization completes).

In step 310, the SNK master and the SNK slave may start to play the audio stream synchronously.

The SNK master and the SNK slave may agree to start to play the audio stream synchronously at an offset from the synchronized clocks of the processors. The SNK master and the SNK slave may agree to start to play the audio stream synchronously when subsequent interruption signals are generated synchronously in the piconet.

Figure 10:
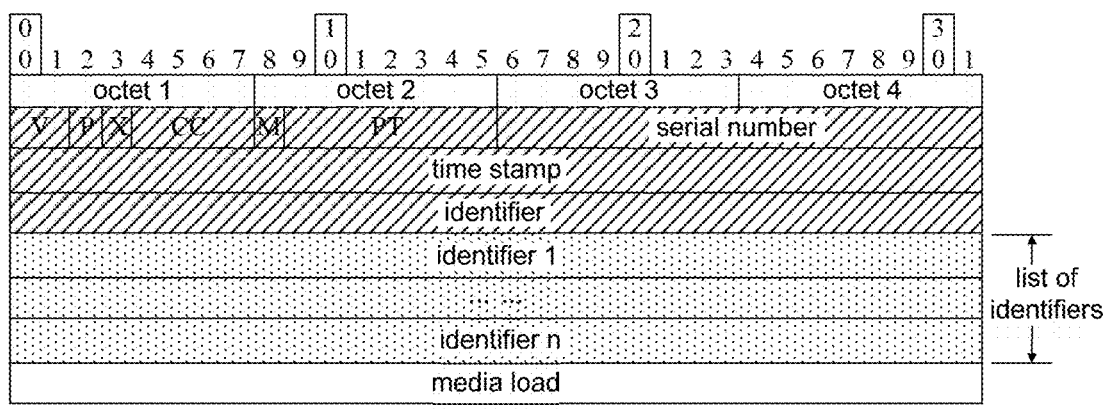
FIG. 10 is a diagram of a structure of an audio packet according to an embodiment herein.

With the synchronized clocks of the processors, the SNK slave and the SNK master may start to play the audio stream synchronously. In addition, using instructions exchanged, a time stamp in an audio packet shown in FIG. 10, and the synchronized clocks of the processors, when playing the same audio packets, the SNK slave and the SNK master may agree on a point of time for discarding a packet synchronously, or filling in any missing data found after decoding the received audio stream.

after processor clocks of the SNK master and the SNK slave are synchronized, each of the SNK master and the SNK slave may calibrate the clock of the processor per se using the clock of the piconet. For example, after processor clock synchronization is achieved, the SNK master may calibrate the clock of the processor per se according to an interruption generated by the BT chip per se. The system clock may be adjusted according to the span of two consecutive interruptions according to the processor clock within a period of time. If the interval between two consecutive interruptions is 1 s according to multiple timings, and then the interval between two consecutive interruptions is found to be 1.5 s, it means that the processor clock is 0.5 s ahead. Then, the clock should be subtracted by 0.5 s.

Description is made below where electronic devices in a wireless communication network synchronize clocks of processors thereof, as shown in FIG. 5-FIG. 6. According to an embodiment herein, a system for synchronizing clocks of processors synchronizes clocks of processors of electronic devices in a wireless communication network.

The system for synchronizing clocks of processors shown in FIG. 5-FIG. 6 may include at least a first electronic device 500, a second electronic device 400, and a third electronic device 300. The function of each electronic device may be described below taking the clock of the processor of the first electronic device as the reference.

The first electronic device 500 is arranged for:

establishing a wireless communication clock synchronized with that at any peer electronic device in the network, the any peer electronic device being any electronic device in the network other than the electronic device 500;

generating interruption signals synchronously with the any peer electronic device according to the wireless communication clock;

recording a clock value of a processor of the first electronic device at generating a last interruption signal by the first electronic device 500; and sending, to the any peer electronic device, a synchronization request including the clock value recorded by the first electronic device 500.

The second electronic device 400 is arranged for:

adjusting, according to a difference between the clock value recorded by the first electronic device 500 and the clock value recorded by the second electronic device 400, a clock of the processor of the second electronic device 400 to be synchronized with a clock of the processor of the first electronic device 500.

The clock value recorded by the second electronic device 400 is the clock value of the processor of the second electronic device 400 at generating a last interruption signal by the second electronic device 400.

The first electronic device 500 may be further arranged for: when the network is a BT network, generating an interruption signal in the first electronic device 500 every predetermined number of cycles of a BT clock.

The first electronic device 500 may be further arranged for: when the network is a WLAN, generating an interruption signal after the first electronic device 500 has received a predetermined number of beacons. The beacons may be sent regularly by an access device of the network.

The first electronic device 500 may be further arranged for:

when the network is a piconet and the any peer electronic device includes at least two peer electronic devices connected to the first electronic device 500, establishing, at the first electronic device 500, the wireless communication clock synchronized with those at the at least two peer electronic devices; and sending synchronization requests to the at least two peer electronic devices synchronously or asynchronously.

The first electronic device 500 may be further arranged for: when the network is a scattered network and each piconet of the scattered network includes at least one peer electronic device connected to the first electronic device 500, establishing, at the first electronic device 500, a wireless communication clock synchronized with that at each peer electronic device. Wireless communication clocks established corresponding respectively to the peer electronic devices may be independent of each other.

The first electronic device 500 may be further arranged for:

generating interruption signals synchronously with the peer electronic devices according to the established wireless communication clock synchronized with those at the peer electronic devices; and sending synchronization requests to the peer electronic devices synchronously or asynchronously. A synchronization request sent to a peer electronic device may include a clock value of a processor recorded when the last interruption signal is generated synchronously with the peer electronic device.

The first electronic device 500 may be further arranged for: when the first electronic device 500 is connected sequentially to peer electronic devices, sending a synchronization request to the second electronic device 400 connected to the first electronic device 500 to trigger processor clock synchronization at the second electronic device 400, and then sending a synchronization request to the third electronic device 300 connected to the second electronic device 400, until processor clock synchronization at each peer electronic device completes sequentially.

The first electronic device 500 may be further arranged for determining whether a peer electronic device has completed processor clock synchronization within an interval spanned by two consecutive interruption signals; If not, sending an updated synchronization request to the peer electronic device. The updated synchronization request may include an updated clock value recorded by the first electronic device 500. The updated clock value recorded by the first electronic device may be the updated clock value of the processor of the first electronic device at generating the last interruption signal by the first electronic device.

The first electronic device 500 may be further arranged for: upon receiving a synchronization response sent by a peer electronic device, determining whether the processor clock value sent to the peer electronic device equals the clock value of the processor of the first electronic device 500 as recorded by the first electronic device at generating the last interruption signal; if so, determining that the peer electronic device has completed processor clock synchronization within an interval spanned by two consecutive interruption signals; if not, determining that the peer electronic device has failed to complete processor clock synchronization within the interval spanned by two consecutive interruption signals.

The first electronic device 500 may be further arranged for: in response to determining that the peer electronic device has completed processor clock synchronization within the interval spanned by two consecutive interruption signals, sending a notification of successful synchronization to the peer electronic device, and receiving a response of successful synchronization sent by the first electronic device 500.

The first electronic device 500 may be further arranged for including, in the notification of successful synchronization or the response of successful synchronization, a common task time of the electronic devices in the network.

The first electronic device 500 may be further arranged for: recording at least two instances of the interval spanned by two consecutive interruption signals generated by the first electronic device 500 according to the clock of the processor of the first electronic device 500; setting a reference span for determining the interval spanned by two consecutive interruption signals according to the recorded at least two instances; and acquiring a jitter offset by subtracting the reference span from the difference between the clock values of the processor of the first electronic device 500 corresponding to two consecutive interruption signals generated by the first electronic device 500; and adjusting the clock of the processor of the first electronic device 500 according to the jitter offset.

The first electronic device 500 may be further arranged for executing, with the any peer electronic device in the network according to the synchronized clocks of the processors thereof within an agreed-on task time, at least one of: starting a computation task; discarding a computation task; modifying a received computation task, etc.

The second electronic device 400 may be further arranged for: when the network is a BT network, generating an interruption signal every predetermined cycles of a BT clock in the second electronic device 400.

The second electronic device 400 may be further arranged for: when the network is a WLAN, generating an interruption signal after a predetermined number of beacons are received at the second electronic device 400. The beacons may be sent regularly by an access device of the network.

The second electronic device 400 may be further arranged for: receiving a synchronization request sent by the first electronic device 500, and sending a synchronization response to the first electronic device 500.

Upon receiving the synchronization response, the first electronic device 500 may determine whether the second electronic device 400 has completed processor clock synchronization within an interval spanned by two consecutive interruption signals by determining whether the clock value in the synchronization request equals the clock value of the processor of the first electronic device 500 as recorded by the first electronic device 500 at generating the last interruption signal.

The second electronic device 400 may be further arranged for: when the second electronic device 400 has not completed processor clock synchronization within the interval spanned by two consecutive interruption signals, receiving an updated synchronization request sent by the first electronic device 500, the updated synchronization request including an updated clock value recorded by the second electronic device 400, the updated clock value recorded by the second electronic device 400 being the updated clock value of the processor of the second electronic device 400 at generating a last interruption signal by the second electronic device 400; and adjusting, according to a difference between the updated clock value recorded by the first electronic device 500 and an updated clock value recorded by the second electronic device 400, the clock of the processor of the second electronic device 400 to be synchronized with the clock of the processor of the first electronic device 500. The updated clock value recorded by the second electronic device 400 may be the updated clock value of the processor of the second electronic device 400 at generating a last interruption signal by the second electronic device 400.

The second electronic device 400 may be further arranged for: when the second electronic device 400 has completed processor clock synchronization within the interval spanned by two consecutive interruption signals, receiving a notification of successful synchronization sent by the first electronic device 500, and sending a response of successful synchronization to the first electronic device 500.

The second electronic device 400 may be further arranged for: including, in the notification of successful synchronization or the response of successful synchronization, a common task time of the electronic devices in the network.

The second electronic device 400 may be further arranged for: after synchronizing the clock of the processor per se with the clock of the processor of the first electronic device 500, recording at least two instances of the interval spanned by two consecutive interruption signals generated by the second electronic device 400 according to the clock of the processor of the second electronic device 400; setting a reference span for determining the interval spanned by two consecutive interruption signals according to the recorded at least two instances; and acquiring a jitter offset by subtracting the reference span from the difference between the clock values of the processor of the second electronic device 400 corresponding to two consecutive interruption signals generated by the second electronic device 400; and adjusting the clock of the processor of the second electronic device 400 according to the jitter offset.

The second electronic device 400 may be further arranged for: when the first electronic device 500 is connected sequentially to peer electronic devices, after the second electronic device 400 connected to the first electronic device 500 has completed processor clock synchronization according to the synchronization request sent by the second electronic device 400, sending a synchronization request to the third electronic device 300 connected to the second electronic device 400.

The second electronic device 400 may be further arranged for: executing, with the any peer electronic device in the network according to the synchronized clocks of the processors thereof within an agreed-on task time, at least one of: starting a computation task; discarding a computation task; modifying a received computation task, etc.

Figure 11:
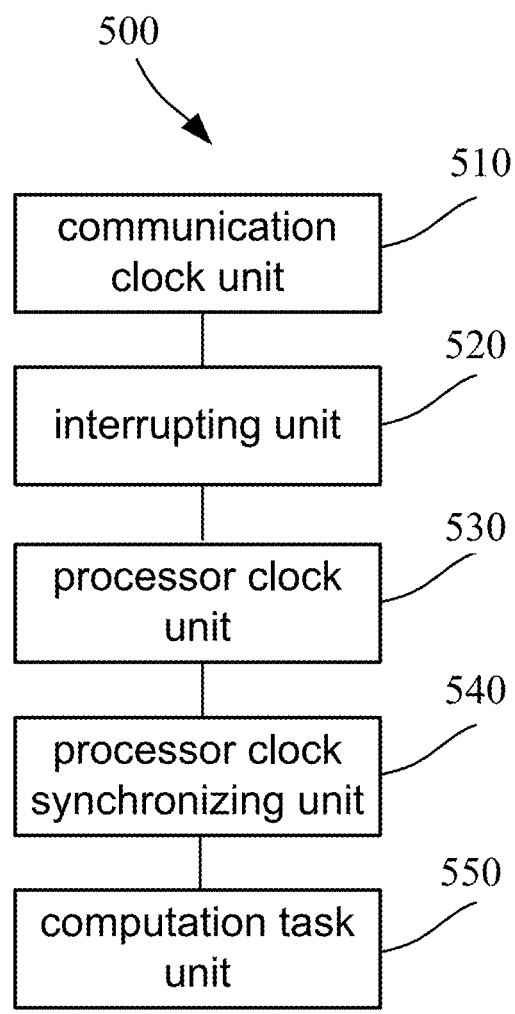
FIG. 11 is a diagram of a structure of a first electronic device according to an embodiment herein.

Referring to FIG. 11, a first electronic device 500 may include a communication clock unit 510, an interrupting unit 520, a processor clock unit 530, and a processor clock synchronizing unit 540. The first electronic device may further include a computation task unit 550.

The communication clock unit 510 may be arranged for: establishing, at the first electronic device 500, a wireless communication clock synchronized with that at any peer electronic device in the network in a network. A peer electronic device may be an electronic device in the network other than the first electronic device 500.

The interrupting unit 520 may be arranged for generating, in the first electronic device 500, interruption signals synchronously with the any peer electronic device according to the wireless communication clock.

The processor clock unit 530 may be arranged for: recording a clock value of a processor of the first electronic device at generating a last interruption signal by the first electronic device 500.

The processor clock synchronizing unit 540 may be arranged for sending, to the any peer electronic device, a synchronization request including the clock value recorded by the processor clock unit 530, to trigger adjusting, by the any peer electronic device according to a difference between the clock value recorded by the first electronic device 500 and a clock value recorded by the any peer electronic device, a clock of a processor of the any peer electronic device to be synchronized with a clock of the processor of the first electronic device 500.

The clock value recorded by the any peer electronic device may be the clock value of the processor of the any peer electronic device at generating a last interruption signal by the any peer electronic device.

The interrupting unit 520 may be further arranged for: when the network is a BT network, generating an interruption signal in the first electronic device 500 every predetermined number of cycles of a BT clock.

The interrupting unit 520 may be further arranged for: when the network is a WLAN, generating the interruption signal after a predetermined number of beacons are received at the first electronic device 500. The beacons may be sent regularly by an access device of the network.

The communication clock unit 510 may be further arranged for:

when the network is a piconet and the any peer electronic device includes at least two peer electronic devices connected to the first electronic device 500, establishing, at the first electronic device 500, the wireless communication clock synchronized with those at the at least two peer electronic devices.

The processor clock synchronizing unit 540 may be further arranged for: sending synchronization requests to the at least two peer electronic devices synchronously or asynchronously.

The communication clock unit 510 may be further arranged for: when the network is a scattered network and each piconet of the scattered network includes at least one peer electronic device connected to the first electronic device 500, establishing, at the first electronic device 500, a wireless communication clock synchronized with that at each peer electronic device. Wireless communication clocks established corresponding respectively to the peer electronic devices may be independent of each other.

The interrupting unit 520 may be further arranged for: generating interruption signals synchronously with the peer electronic devices according to the established wireless communication clock synchronized with those at the peer electronic devices.

The processor clock synchronizing unit 540 may be further arranged for: sending synchronization requests to the peer electronic devices synchronously or asynchronously. A synchronization request sent to a peer electronic device may include a clock value of a processor recorded when the last interruption signal is generated synchronously with the peer electronic device.

The processor clock synchronizing unit 540 may be further arranged for: when the first electronic device 500 is connected sequentially to peer electronic devices, sending a synchronization request to the second electronic device 400 connected to the first electronic device 500 to trigger processor clock synchronization at the second electronic device 400, and then sending a synchronization request to the third electronic device 300 connected to the second electronic device 400, until processor clock synchronization at each peer electronic device completes sequentially.

The processor clock synchronizing unit 540 may be further arranged for determining whether a peer electronic device has completed processor clock synchronization within an interval spanned by two consecutive interruption signals; If not, sending an updated synchronization request to the peer electronic device. The updated synchronization request may include an updated clock value recorded by the first electronic device 500. The updated clock value recorded by the first electronic device may be the updated clock value of the processor of the first electronic device at generating the last interruption signal by the first electronic device.

The processor clock synchronizing unit 540 may be further arranged for: upon receiving a synchronization response sent by a peer electronic device, determining whether the processor clock value sent to the peer electronic device equals the clock value of the processor of the first electronic device 500 as recorded by the first electronic device at generating the last interruption signal; if so, determining that the peer electronic device has completed processor clock synchronization within an interval spanned by two consecutive interruption signals; if not, determining that the peer electronic device has failed to complete processor clock synchronization within the interval spanned by two consecutive interruption signals.

The processor clock synchronizing unit 540 may be further arranged for: in response to determining that the peer electronic device has completed processor clock synchronization within the interval spanned by two consecutive interruption signals, sending a notification of successful synchronization to the peer electronic device, and receiving a response of successful synchronization sent by the peer electronic device.

The processor clock synchronizing unit 540 may be further arranged for: recording at least two instances of the interval spanned by two consecutive interruption signals generated by the first electronic device 500 according to the clock of the processor of the first electronic device 500; setting a reference span for determining the interval spanned by two consecutive interruption signals according to the recorded at least two instances; and acquiring a jitter offset by subtracting the reference span from the difference between the clock values of the processor of the first electronic device 500 corresponding to two consecutive interruption signals generated by the first electronic device 500; and adjusting the clock of the processor of the first electronic device 500 according to the jitter offset.

The first electronic device may further include:

the computation task unit 550 arranged for: executing, with the any peer electronic device in the network according to the synchronized clocks of the processors thereof within an agreed-on task time, at least one of: starting a computation task; discarding a computation task; modifying a received computation task, etc.

Figure 12:
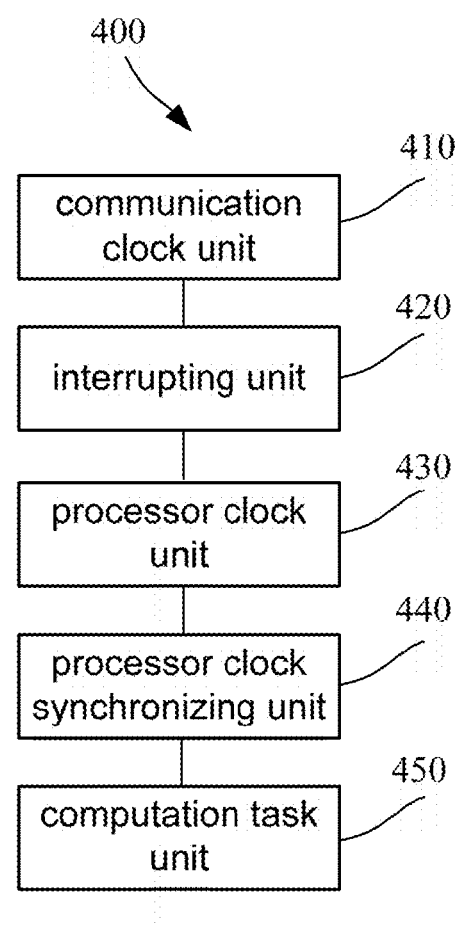
FIG. 12 is a diagram of a structure of a second electronic device according to an embodiment herein.

Referring to FIG. 12, a second electronic device 400 may include a communication clock unit 410, an interrupting unit 420, a processor clock unit 430 and a processor clock synchronizing unit 440. The second electronic device may further include a computation task unit 450.

The communication clock unit 410 may be arranged for: establishing, at the second electronic device 400, a wireless communication clock synchronized with that at any peer electronic device in the network. A peer electronic device may be an electronic device in the network other than the second electronic device 400.

The interrupting unit 420 may be arranged for generating interruption signals synchronously with the any peer electronic device according to the wireless communication clock, and recording a clock value of a processor of the second electronic device at generating a last interruption signal by the second electronic device 400.

The processor clock unit 430 may be arranged for: receiving a synchronization request sent by the first electronic device 500. The synchronization request may include a clock value recorded by the first electronic device 500. The clock value recorded by the first electronic device 500 may be the clock value of a processor of the first electronic device 500 at generating a last interruption signal by the first electronic device 500.

The processor clock synchronizing unit 440 may be arranged for: adjusting, according to a difference between the clock value recorded by the first electronic device 500 and the clock value recorded by the second electronic device 400, a clock of the processor of the second electronic device 400 to be synchronized with a clock of the processor of the first electronic device 500.

The clock value recorded by the second electronic device 400 may be the clock value of the processor of the second electronic device 400 at generating a last interruption signal by the second electronic device 400.

The interrupting unit 420 may be further arranged for: when the network is a BT network, generating an interruption signal every predetermined cycles of a BT clock in the second electronic device 400.

The interrupting unit 420 may be further arranged for: when the network is a WLAN, generating an interruption signal after a predetermined number of beacons are received at the second electronic device 400. The beacons may be sent regularly by an access device of the network.

The processor clock synchronizing unit 440 may be further arranged for: receiving a synchronization request sent by the first electronic device 500, and sending a synchronization response to the first electronic device 500.

Upon receiving the synchronization response, the first electronic device 500 may determine whether the second electronic device 400 has completed processor clock synchronization within an interval spanned by two consecutive interruption signals by determining whether the clock value in the synchronization request equals the clock value of the processor of the first electronic device 500 as recorded by the first electronic device 500 at generating the last interruption signal.

The processor clock unit 430 may be further arranged for: when the processor clock synchronizing unit 440 has not completed processor clock synchronization within the interval spanned by two consecutive interruption signals, receiving an updated synchronization request sent by the first electronic device 500. The updated synchronization request may include an updated clock value recorded by the second electronic device 400. The updated clock value recorded by the second electronic device 400 may be the updated clock value of the processor of the second electronic device 400 at generating a last interruption signal by the second electronic device 400.

The processor clock synchronizing unit 440 may be further arranged for: adjusting, according to a difference between the updated clock value recorded by the first electronic device 500 and an updated clock value recorded by the second electronic device 400, the clock of the processor of the second electronic device 400 to be synchronized with the clock of the processor of the first electronic device 500. The updated clock value recorded by the second electronic device 400 may be the updated clock value of the processor of the second electronic device 400 at generating a last interruption signal by the second electronic device 400.

The processor clock synchronizing unit 440 may be further arranged for: when the second electronic device 400 has completed processor clock synchronization within the interval spanned by two consecutive interruption signals, receiving a notification of successful synchronization sent by the first electronic device 500, and sending a response of successful synchronization to the first electronic device 500.

The processor clock synchronizing unit 440 may be further arranged for: after synchronizing the clock of the processor per se with the clock of the processor of the first electronic device 500, recording at least two instances of the interval spanned by two consecutive interruption signals generated by the second electronic device 400 according to the clock of the processor of the second electronic device 400; setting a reference span for determining the interval spanned by two consecutive interruption signals according to the recorded at least two instances.

The processor clock synchronizing unit 440 may be further arranged for: acquiring a jitter offset by subtracting the reference span from the difference between the clock values of the processor of the second electronic device 400 corresponding to two consecutive interruption signals generated by the second electronic device 400; and adjusting the clock of the processor of the second electronic device 400 according to the jitter offset.

The second electronic device may further include:

the computation task unit 450 arranged for: executing, with the any peer electronic device in the network according to the synchronized clocks of the processors thereof within an agreed-on task time, at least one of: starting a computation task; discarding a computation task; modifying a received computation task; etc.

Note that division of the functional structures of the first electronic device 500 and the second electronic device 400 is but illustrative. Based on what described herein, those skilled in the art may easily vary the structures of the electronic devices, such as by combining some of the modules herein, and/or dividing a module herein into multiple sub-modules. Therefore, the functional structures of the electronic devices described herein are not intended to limit a structure of an electronic device herein.

According to an embodiment herein, a computer-readable storage medium stores therein executable instructions for executing a method for synchronizing clocks of processors herein as shown in FIG. 4 and FIG. 7. The storage medium herein may be a non-transitory storage medium such as a CD, a flash memory, a magnetic disk, etc.

To sum up, embodiments herein are advantageous as follows.

On one hand, the second electronic device records the clock value of the processor per se corresponding to an interruption signal according to the clock of the processor per se; acquires the clock value recorded by the first electronic device as of the processor of the first electronic device according to the clock of the processor of the first electronic device; acquires the difference between the clock value recorded by the first electronic device and the clock value recorded per se, providing an accurate measure of the deviation of the clock of the processor of the second electronic device from the clock of the processor of the first electronic device, thus implementing accurate synchronization of the clocks of the processors.

On the other hand, compared to the existing art where clocks of processors are synchronized by reading clocks of respective processors, determining an amount by which the clock is to be adjusted according to the readings, and adjusting the clocks accordingly, the second electronic device adjusts the clock of the processor per se according to the difference between the clock values of the processors, avoiding a delay and a jitter of a clock of a processor caused by directly reading the clock of the processor, such that clocks of processors of the electronic devices may be synchronized more efficiently, with accuracy thereof guaranteed.

Those skilled in the art may understand that all or part of the steps of the embodiments may be implemented by instructing a related hardware through a program, which program may be stored in a transitory or non-transitory computer-readable storage medium. When executed, the program may execute steps including those of the embodiments. The computer-readable storage medium may be various media that can store program codes, such as mobile storage equipment, Read-Only Memory (ROM), a Random Access Memory (RAM), a magnetic disk, a CD, and/or the like.

When implemented in form of a software functional module and sold or used as an independent product, an integrated module herein may also be stored in a transitory or non-transitory computer-readable storage medium. Based on such an understanding, the essential part or a part contributing to prior art of the technical solution of an embodiment of the present disclosure may appear in form of a software product stored in storage medium, and may include a number of instructions for allowing computer equipment (such as a personal computer, a server, network equipment, and/or the like) to execute all or part of the method according to embodiments herein. The storage medium may include various media that can store program codes, such as mobile storage equipment, ROM, RAM, a magnetic disk, a CD, and/or the like.

What described are but embodiments herein and are not intended to limit the scope of the present disclosure. Any modification, equivalent replacement, and/or the like made within the spirit as well as principle of the present disclosure, as may occur to those skilled in the art, shall be included in the scope of the present disclosure. The scope of the present disclosure thus should be determined as claimed by the claims.

The invention claimed is:

1. A method for synchronizing clocks of processors, applying to a network comprising at least a first electronic device and a second electronic device in wireless communication, the method comprising:
    establishing, at the first electronic device, a wireless communication clock synchronized with that at any peer electronic device in the network;
    generating, by the first electronic device, interruption signals synchronously with the any peer electronic device according to the wireless communication clock;
    recording, by the first electronic device, a clock value of a processor of the first electronic device at generating a last interruption signal by the first electronic device; and
    sending, by the first electronic device to the any peer electronic device, a synchronization request comprising the clock value recorded by the first electronic device, to trigger adjusting, by the any peer electronic device according to a difference between the clock value recorded by the first electronic device and a clock value recorded by the any peer electronic device, a clock of a processor of the any peer electronic device to be synchronized with a clock of the processor of the first electronic device,
    wherein the clock value recorded by the any peer electronic device is the clock value of the processor of the any peer electronic device at generating a last interruption signal by the any peer electronic device,
    wherein the method further comprises:
    determining, by the first electronic device, whether the any peer electronic device has completed processor clock synchronization within an interval spanned by two consecutive interruption signals; if the any peer electronic device has not, sending, to the any peer electronic device, an updated synchronization request comprising an updated clock value recorded by the first electronic device, wherein the updated clock value recorded by the first electronic device is the updated clock value of the processor of the first electronic device at generating the last interruption signal by the first electronic device.

2. The method according to claim 1, wherein the generating, by the first electronic device, interruption signals synchronously with the any peer electronic device according to the wireless communication clock comprises:
    when the network is a Bluetooth (BT) network, generating an interruption signal in the first electronic device every predetermined number of cycles of a BT clock.

3. The method according to claim 1, wherein the generating, by the first electronic device, interruption signals synchronously with the any peer electronic device according to the wireless communication clock comprises:
    when the network is a Wireless Local Area Network (WLAN), generating an interruption signal after the first electronic device has received a predetermined number of beacons, wherein the beacons are sent regularly by an access device of the network.

4. The method according to claim 1,
    wherein the establishing, at the first electronic device, a wireless communication clock synchronized with that at any peer electronic device in the network comprises:
    when the network is a piconet and the any peer electronic device comprises at least two peer electronic devices connected to the first electronic device, establishing, at the first electronic device, the wireless communication clock synchronized with those at the at least two peer electronic devices,
    wherein the sending, by the first electronic device to the any peer electronic device, a synchronization request comprises:
    sending synchronization requests to the at least two peer electronic devices synchronously or asynchronously.

5. The method according to claim 1,
    wherein the establishing, at the first electronic device, a wireless communication clock synchronized with that at any peer electronic device in the network comprises:
    when the network is a scattered network and each piconet of the scattered network comprises at least one peer electronic device connected to the first electronic device, establishing, at the first electronic device, a wireless communication clock synchronized with that at each peer electronic device, wherein wireless communication clocks established corresponding respectively to peer electronic devices are independent of each other,
    wherein the generating, by the first electronic device, interruption signals synchronously with the any peer electronic device according to the wireless communication clock comprises:
    generating interruption signals synchronously with the each peer electronic device according to the established wireless communication clock synchronized with that at the each peer electronic device,
    wherein the sending, by the first electronic device to the any peer electronic device, a synchronization request comprising the clock value recorded by the first electronic device comprises:
    sending, by the first electronic device, synchronization requests to the peer electronic devices synchronously or asynchronously, wherein a synchronization request sent by the first electronic device to a peer electronic device comprises a clock value of the processor of the first electronic device recorded by the first electronic device when generating the last interruption signal synchronously with the peer electronic device.

6. The method according to claim 1,
wherein the sending, by the first electronic device to the any peer electronic device, a synchronization request comprises:
when the first electronic device is connected sequentially to peer electronic devices, sending, by the first electronic device, a synchronization request to the second electronic device connected to the first electronic device to trigger processor clock synchronization at the second electronic device, such that the second electronic device sends a synchronization request to a third electronic device connected to the second electronic device, until processor clock synchronization at each peer electronic device completes sequentially.

7. The method according to claim 1,
wherein the determining, by the first electronic device, whether the any peer electronic device has completed processor clock synchronization within an interval spanned by two consecutive interruption signals comprises:
upon receiving a synchronization response sent by the any peer electronic device, determining, by the first electronic device, whether the clock value sent to the any peer electronic device equals the clock value of the processor of the first electronic device as recorded by the first electronic device at generating the last interruption signal; if they equal, determining that the any peer electronic device has completed processor clock synchronization within the interval spanned by two consecutive interruption signals; if they do not equal, determining that the any peer electronic device has failed to complete processor clock synchronization within the interval spanned by two consecutive interruption signals.

8. The method according to claim 1, further comprising:
in response to determining that the any peer electronic device has completed processor clock synchronization within an interval spanned by two consecutive interruption signals, sending, by the first electronic device, a notification of successful synchronization to the any peer electronic device, and receiving a response of successful synchronization sent by the any peer electronic device.

9. The method according to claim 1, further comprising:
recording, by the first electronic device, at least two instances of an interval spanned by two consecutive interruption signals generated by the first electronic device according to the clock of the processor of the first electronic device;
setting, by the first electronic device, a reference span for determining the interval spanned by two consecutive interruption signals according to the recorded at least two instances;
acquiring, by the first electronic device, a jitter offset by subtracting the reference span from a difference between clock values of the processor of the first electronic device corresponding to two consecutive interruption signals generated by the first electronic device; and adjusting, by the first electronic device, the clock of the processor of the first electronic device according to the jitter offset.

10. The method according to claim 1, further comprises:
executing, with the any peer electronic device in the network according to the synchronized clocks of the processors within an agreed-on task time, at least one of: starting a computation task; discarding a computation task; or modifying a received computation task.

11. A method for synchronizing clocks of processors, applying to a network comprising at least a first electronic device and a second electronic device in wireless communication, the method comprising:
establishing, at the second electronic device, a wireless communication clock synchronized with that at any peer electronic device in the network;
generating, by the second electronic device, interruption signals synchronously with the any peer electronic device according to the wireless communication clock;
recording, by the second electronic device, a clock value of a processor of the second electronic device at generating a last interruption signal by the second electronic device;
receiving, by the second electronic device, a synchronization request sent by the first electronic device, the synchronization request comprising a clock value recorded by the first electronic device, wherein the clock value recorded by the first electronic device is the clock value of a processor of the first electronic device at generating a last interruption signal by the first electronic device; and
adjusting, by the second electronic device according to a difference between the clock value recorded by the first electronic device and the clock value recorded by the second electronic device, a clock of the processor of the second electronic device to be synchronized with a clock of the processor of the first electronic device,
wherein the method further comprises: after the receiving, by the second electronic device, a synchronization request sent by the first electronic device,
sending, by the second electronic device, a synchronization response to the first electronic device,
such that upon receiving the synchronization response, the first electronic device determines whether the second electronic device has completed processor clock synchronization within an interval spanned by two consecutive interruption signals by determining whether the clock value in the synchronization request equals the clock value of the processor of the first electronic device as recorded by the first electronic device at generating the last interruption signal.

12. The method according to claim 11, wherein the generating, by the second electronic device, interruption signals synchronously with the any peer electronic device according to the wireless communication clock comprises:
when the network is a Bluetooth (BT) network, generating an interruption signal every predetermined cycles of a BT clock in the second electronic device.

13. The method according to claim 11, wherein the generating, by the second electronic device, interruption signals synchronously with the any peer electronic device according to the wireless communication clock comprises:
when the network is a Wireless Local Area Network (WLAN), generating an interruption signal after a predetermined number of beacons are received at the second electronic device, wherein the beacons are sent regularly by an access device of the network.

14. The method according to claim 11, further comprising:
- when the second electronic device has not completed processor clock synchronization within the interval spanned by two consecutive interruption signals, receiving, by the second electronic device, an updated synchronization request sent by the first electronic device comprising an updated clock value recorded by the first electronic device, the updated clock value recorded by the first electronic device being the updated clock value of the processor of the first electronic device at generating a last interruption signal by the first electronic device;
- adjusting, according to a difference between the updated clock value recorded by the first electronic device and an updated clock value recorded by the second electronic device, the clock of the processor of the second electronic device to be synchronized with the clock of the processor of the first electronic device, wherein the updated clock value recorded by the second electronic device is the updated clock value of the processor of the second electronic device at generating the last interruption signal by the second electronic device.

15. The method according to claim 11, further comprising:
- when the second electronic device has completed processor clock synchronization within the interval spanned by two consecutive interruption signals, receiving, by the second electronic device, a notification of successful synchronization sent by the first electronic device, and sending a response of successful synchronization to the first electronic device.

16. The method according to claim 11, further comprising: after synchronizing the clock of the processor of the second electronic device with the clock of the processor of the first electronic device,
- recording, by the second electronic device, at least two instances of an interval spanned by two consecutive interruption signals generated by the second electronic device according to the clock of the processor of the second electronic device;
- setting, by the second electronic device, a reference span for determining the interval spanned by two consecutive interruption signals according to the recorded at least two instances; and
- acquiring, by the second electronic device, a jitter offset by subtracting the reference span from a difference between the clock values of the processor of the second electronic device corresponding to two consecutive interruption signals generated by the second electronic device; and
- adjusting, by the second electronic device, the clock of the processor of the second electronic device according to the jitter offset.

17. The method according to claim 11, further comprising:
- when the first electronic device is connected sequentially to peer electronic devices, after the second electronic device connected to the first electronic device has completed processor clock synchronization according to the synchronization request sent by the first electronic device, sending, by the second electronic device, a synchronization request to a third electronic device connected to the second electronic device.

18. A system for synchronizing clocks of processors, comprising at least a first electronic device and a second electronic device in wireless communication that form a network,
- wherein the first electronic device is arranged for:
- establishing a wireless communication clock synchronized with that at any peer electronic device in the network;
- generating interruption signals synchronously with the any peer electronic device according to the wireless communication clock;
- recording a clock value of a processor of the first electronic device at generating a last interruption signal by the first electronic device; and
- sending, to the any peer electronic device, a synchronization request comprising the clock value recorded by the first electronic device,
- wherein the second electronic device is arranged for:
- adjusting, according to a difference between the clock value recorded by the first electronic device and a clock value recorded by the second electronic device, a clock of a processor of the second electronic device to be synchronized with a clock of the processor of the first electronic device,
- wherein the clock value recorded by the second electronic device is the clock value of the processor of the second electronic device at generating a last interruption signal by the second electronic device,
- wherein the second electronic device is arranged for: after receiving the synchronization request sent by the first electronic device,
- sending a synchronization response to the first electronic device,
- wherein the first electronic device is arranged for:
- receiving the synchronization response;
- determining whether the second electronic device has completed processor clock synchronization within an interval spanned by two consecutive interruption signals by determining whether the clock value in the synchronization request equals the clock value of the processor of the first electronic device as recorded by the first electronic device at generating the last interruption signal; if the second electronic device has not, sending, to the second electronic device, an updated synchronization request comprising an updated clock value recorded by the first electronic device, wherein the updated clock value recorded by the first electronic device is the updated clock value of the processor of the first electronic device at generating the last interruption signal by the first electronic device.

* * * * *